(12) United States Patent
Paulson et al.

(10) Patent No.: US 12,073,410 B2
(45) Date of Patent: Aug. 27, 2024

(54) GENERATING A MULTI-TRANSACTION DISPUTE PACKAGE

(71) Applicant: Chime Financial, Inc., San Francisco, CA (US)

(72) Inventors: Catherine Paulson, San Francisco, CA (US); Clem Akomea-Agyin, Oakland, CA (US); Daniel Klein, Corte Madera, CA (US); Deivide Oliveira, Coquitlam (CA); Jacek Faliszewski, Cracow (PL); Kuan-Wen Lo, Freemont, CA (US); Marcus Vinson, Austin, TX (US); Siddhi Soman, San Francisco, CA (US)

(73) Assignee: Chime Financial, Inc., San Francisco, CA (US)

( * ) Notice: Subject to any disclaimer, the term of this patent is extended or adjusted under 35 U.S.C. 154(b) by 172 days.

(21) Appl. No.: 17/651,197

(22) Filed: Feb. 15, 2022

(65) Prior Publication Data
US 2023/0259948 A1 Aug. 17, 2023

(51) Int. Cl.
*G06Q 20/40* (2012.01)
*G06N 20/00* (2019.01)

(52) U.S. Cl.
CPC ........... *G06Q 20/407* (2013.01); *G06N 20/00* (2019.01); *G06Q 20/4016* (2013.01); *G06Q 20/405* (2013.01)

(58) Field of Classification Search
CPC . G06Q 20/407; G06Q 20/4016; G06Q 20/405
USPC ......................................................... 705/44
See application file for complete search history.

(56) References Cited

U.S. PATENT DOCUMENTS

| | | | |
|---|---|---|---|
| 2017/0053278 A1* | 2/2017 | Gerard | G06Q 20/407 |
| 2020/0364713 A1* | 11/2020 | Douglas | G06Q 20/405 |
| 2021/0174366 A1* | 6/2021 | Zeng | G06Q 20/4016 |
| 2021/0390545 A1* | 12/2021 | Martinez-Guarneros | G06Q 20/407 |
| 2022/0230174 A1* | 7/2022 | Khare | H04L 9/3297 |

\* cited by examiner

*Primary Examiner* — Lindsay M Maguire
(74) *Attorney, Agent, or Firm* — Keller Preece PLLC

(57) ABSTRACT

The present disclosure relates to systems, non-transitory computer-readable media, and methods for generating a multi-transaction dispute package. For example, in one or more embodiments, the disclosed system receives a dispute request with an initial disputed transaction and identifies other potential transactions based on dispute classifications. In one or more embodiments, the disclosed system provides the identified potential transactions that are potentially related to the initial disputed transaction for selection. In response to receiving a selection from the user, the disclosed system generates and processes a multi-transaction dispute package.

20 Claims, 14 Drawing Sheets

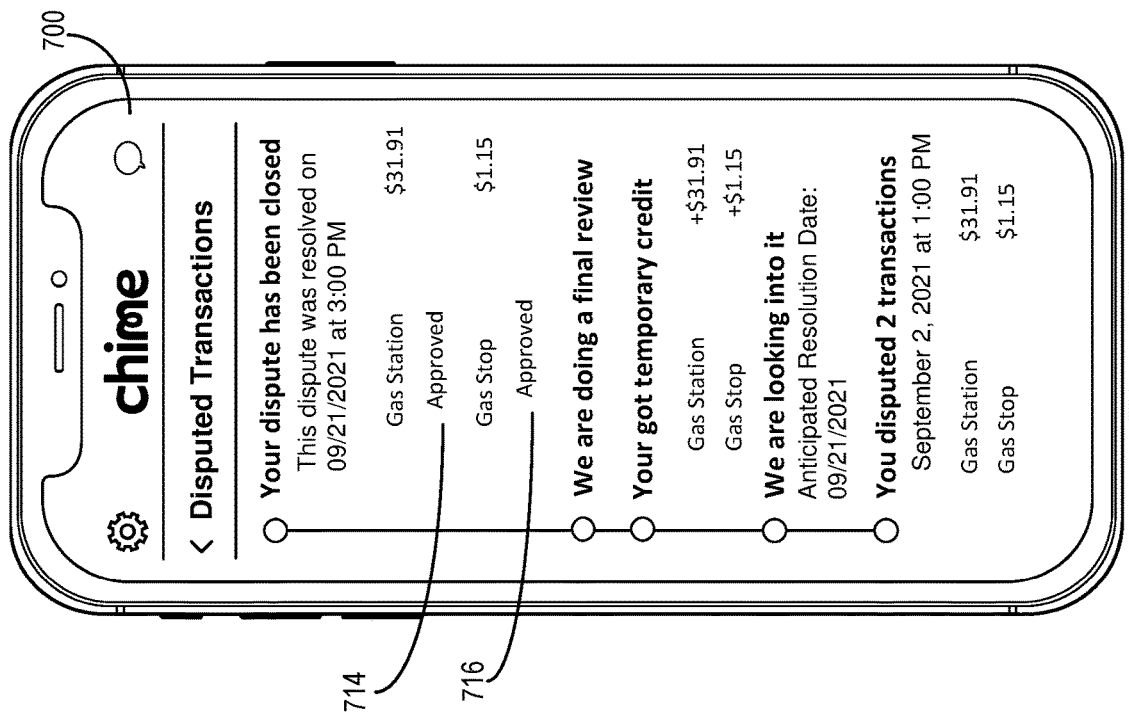
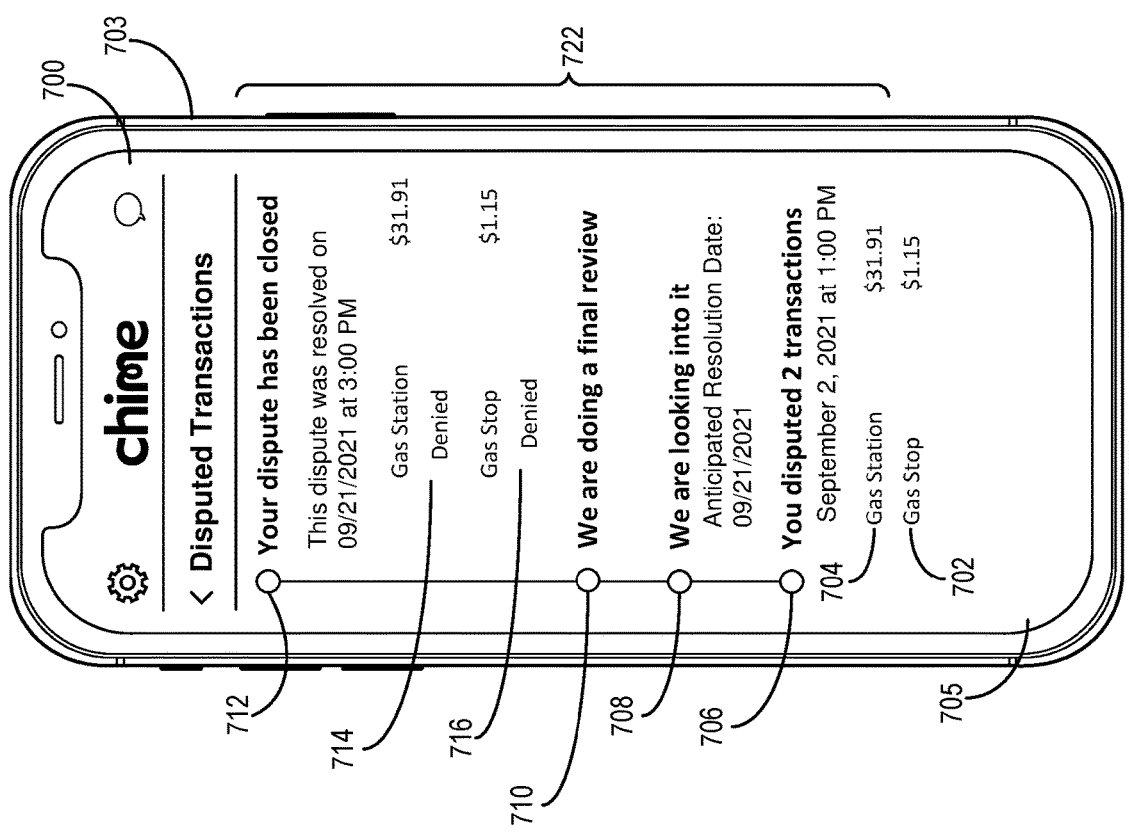
Fig. 7A
Fig. 7B

GENERATING A MULTI-TRANSACTION DISPUTE PACKAGE

BACKGROUND

Recent years have seen significant improvements in utilizing computing devices to facilitate transactions and events associated with financial transactions. One event associated with transactions is the event of disputing a transaction. For example, conventional systems can allow a user to place a phone call, send an email, or use a client device application to dispute a transaction. To illustrate, conventional systems can receive a voice call and connect an agent to process the transaction dispute. Alternatively, conventional systems can receive an email from a client device or a text-based message via the client device application, describing a disputed transaction. Further, conventional systems can also provide an in-application option to dispute a transaction. Regardless of the channel through which conventional systems receive a transaction dispute request, for various reasons discussed below, conventional systems are limited to receiving and processing a dispute on a single-transaction basis.

One reason conventional systems limit filing disputes to a single transaction at a time is to reduce the amount of fraudulently disputed transactions. Indeed, submitting a transaction dispute request is an opportunity for a bad actor to potentially defraud an institution. For example, a bad actor may purchase a product at a particular merchant and then fraudulently dispute the transaction in an attempt to obtain a meritless refund and essentially get the product for free. In another example, a bad actor may withdraw cash from an ATM, and then dispute the ATM transaction to hopefully walk away with the stolen cash. Accordingly, while a transaction dispute process is necessary to rectify actual incorrect transactions, conventional systems limit dispute requests to only a single transaction to reduce bad actors' ability to scale fraudulent transaction disputes.

In addition to the need to reduce the amount of fraudulently disputed transactions, conventional systems limit dispute requests to a single transaction due to technical limitations. In particular, there are various different categories or types of transaction disputes, and conventional systems typically process each dispute category differently (e.g., dispute requests are routed to different agents, have different approval processes, etc. based on a dispute category). Because each transaction dispute may have to be treated differently within a dispute resolution process, conventional systems lack the ability to combine transactions in an effective way that doesn't result in transaction disputes being misrouted, inaccurately approved, or declined, or other similar errors that prolongs the dispute resolution process while also reducing the accuracy of the dispute resolution process.

Indeed, because conventional systems limit dispute requests to a single transaction, conventional systems have a number of disadvantages in relation to user experience within a user interface, efficiency, and flexibility. For example, in the event a user has a bonafide reason to dispute several transactions, in conventional systems, and with respect to a client device application, the user must navigate through several different user interfaces, locate each of several transactions separately, and create a separate dispute claim for each one. Thus, it takes several steps for a user to file a single transaction dispute, and that several step process must be repeated for each of the disputed transactions. Moreover, due to the separate transaction disputes, conventional systems also must separately process the disputes, which places additional burdens on computational resources of implementing devices and systems by decreasing the processing bandwidth, utilizing excessive processing power, and inefficiently occupying storage resources.

BRIEF SUMMARY

This disclosure describes one or more embodiments of methods, non-transitory computer-readable media, and systems that can solve the foregoing problems in addition to providing other benefits by generating a multi-transaction dispute package based in part on identifying potential transactions that could logically be disputed based on a relationship with an initial disputed transaction. For example, the disclosed systems receive a dispute request from a client device with information associated with an initial disputed transaction. The disclosed system identifies potential transactions within the user account that are potentially related with the initial disputed transaction. Moreover, the disclosed system then provides the identified potential transactions to the client device, receives a selection of at least one additional disputed transaction from the client device, and generates a multi-transaction dispute package (e.g., the multi-transaction dispute package includes the initial disputed transaction and at least one additional disputed transaction). The disclosed system receives and processes the multi-transaction dispute package to generate a dispute resolution for each transaction in the multi-transaction dispute package. Additionally, while the disclosed system is processing the multi-transaction dispute package, the system provides status notifications to the client device, which conveys information such as one or more resolution events associated with each disputed transaction.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIGS. 7A-7C illustrate an example graphical user interface on a client device relating to a timeline in accordance with one or more embodiments.

DETAILED DESCRIPTION

Figure 1:
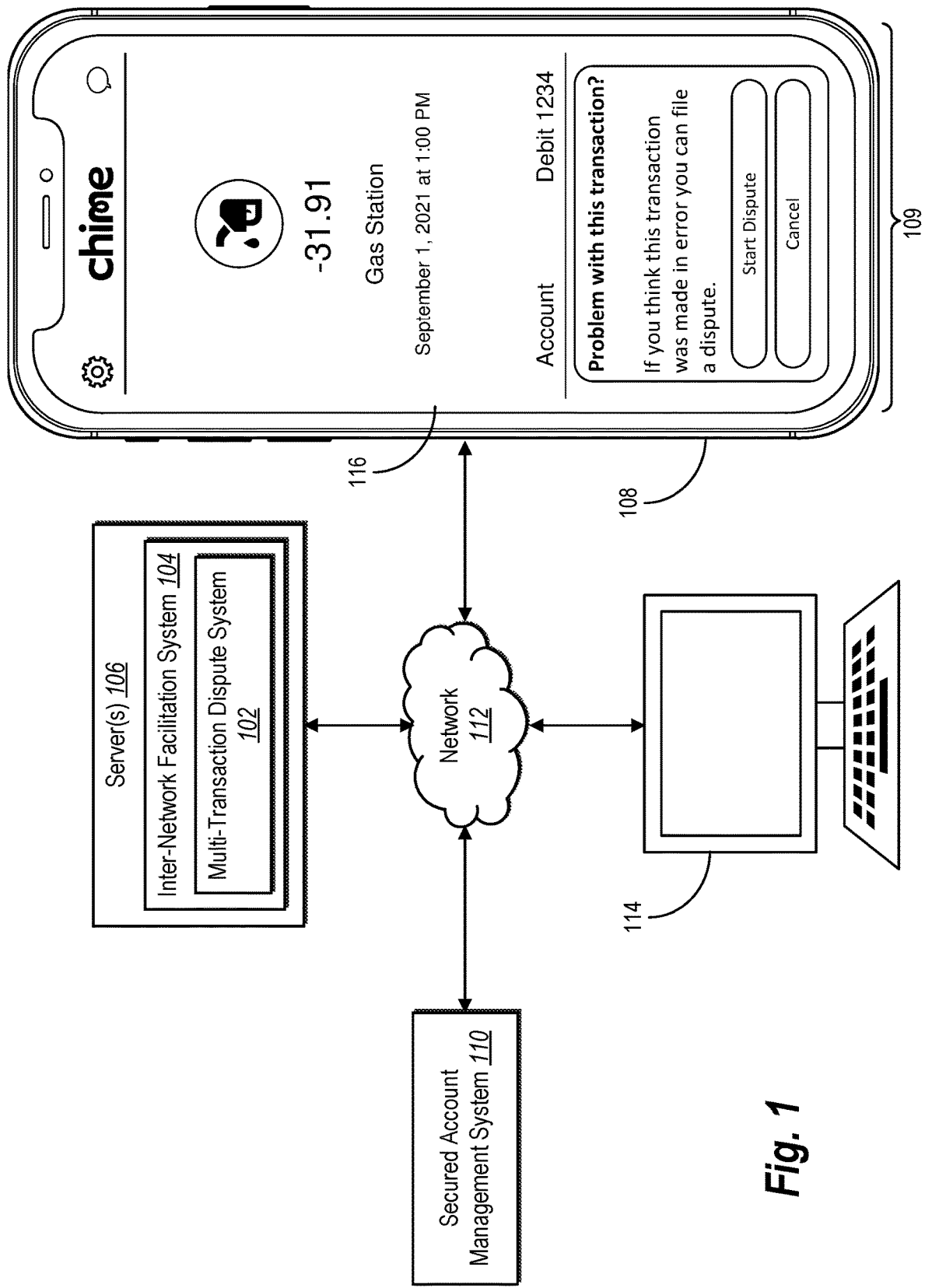
FIG. 1 illustrates a block diagram of an environment for implementing a multi-transaction dispute system in accordance with one or more embodiments.

This disclosure describes one or more embodiments of a multi-transaction dispute system that receives an initial disputed transaction, identifies potential transactions related to the initial disputed transaction, and provides an option to generate a multi-transaction dispute package that includes the initial disputed transaction and at least one additional disputed transaction. For example, based on a user interacting with a client application on a client device, the multi-transaction dispute system can receive a user-identified initial transaction for dispute. The multi-transaction dispute system uses information associated with the initial disputed transaction to identify a select subset of potential transactions from the user's account that are related to the initial transaction. Further, the multi-transaction dispute system provides the potential transactions as options to allow the user to select one or more of the potential transactions to combine with the initial disputed transaction within a multi-transaction dispute package. Upon generating the multi-transaction dispute package, the multi-transaction dispute system processes each of the transactions in a combined resolution process to generate a dispute resolution for each transaction. Using the above principles, the multi-transaction dispute system can efficiently and accurately process dispute transactions while maintaining high security standards which reduce fraudulent transaction dispute requests.

To elaborate, the multi-transaction dispute system can identify potential transactions that are related to an initial disputed transaction. In one embodiment, the multi-transaction dispute system determines a dispute classification of the initially disputed transaction. Based on the dispute classification of the initial transaction, the multi-transaction dispute system can identify one or more potential transactions that would have the same dispute classification if disputed. For example, the multi-transaction dispute system can identify and use a variety of dispute classifications to identify potential transactions, such as: an unauthorized transaction, non-receipt of goods, a device malfunction, a cancelled transaction, a non-matching description of goods received, an unauthorized external transfer, or a duplicate transaction, etc.

As will be explained further below, the multi-transaction dispute system can determine the dispute classification associated with the initial transaction through a variety of methods. For example, the dispute classification system can determine the dispute classification associated with the initial transaction based on information associated with the initial transaction (e.g., merchant, amount, date, type of transaction). In other cases, or embodiments, the multi-transaction dispute system can receive a dispute classification from the client device that was user defined when generating the initial dispute request. In other embodiments, the multi-transaction dispute system can provide a series of interactive queries to the client device to ascertain a dispute classification based on user responses to the interactive queries.

Furthermore, using the information associated with the initial disputed transaction and the determined dispute classification, the multi-transaction dispute system identifies potential transactions by analyzing metadata corresponding to transactions within a user account to determine whether a particular transaction's metadata meets certain conditions (e.g., date, recency, merchant name, merchant type, transaction amount, etc.). The set of conditions vary based on the determined dispute classification of the initial transaction. In one or more embodiments, the multi-transaction dispute system uses a rule-based approach to analyze transaction metadata and apply the conditions, while in other embodiments the multi-transaction dispute system uses a machine learning model, as will be described in further detail below.

In some embodiments, the multi-transaction dispute system provides a ranked order list of the potential transactions to the client device based on the results of analyzing the transaction metadata. Based on providing the potential transactions for display on the client device, the multi-transaction dispute system then receives a selection of at least one additional disputed transaction and generates a multi-transaction dispute package. The multi-transaction dispute system receives the package and can process it through a dispute resolution process (e.g., an agent device or automatic processing by the multi-transaction dispute system).

During the dispute resolution process for the multi-transaction dispute package, the multi-transaction dispute system provides the client device with status notifications associated with each disputed transaction within the multi-transaction dispute package. In one embodiment, the multi-transaction dispute system provides a timeline for display on the client device, the timeline including one or more resolution events associated with the transactions included in the multi-transaction dispute package. The timeline interface can indicate on the client device the status of the dispute resolution process. For example, the status can include when the agent device receives the multi-transaction dispute package, when processing occurs, a resolution date, and a current status of each transaction within the multi-transaction dispute package.

As suggested above, the disclosed multi-transaction dispute system provides several improvements or advantages over conventional systems. For example, the multi-transaction dispute system can improve on the efficiency of conventional systems by receiving an initial disputed transaction, securely identifying potential transactions potentially related to the initial disputed transaction, and generating a multi-transaction dispute package for processing. Accordingly, the multi-transaction dispute system allows for filing and processing of multiple transactions together in a single dispute claim while maintaining an accurate and secure process that reduces fraud.

Unlike conventional systems that are limited to single-transaction dispute requests to avoid an onslaught of fraudulent requests, the multi-transaction dispute system has the capability of generating and processing a multi-transaction dispute package while limiting any potential fraud. In particular, because the multi-transaction dispute system intelligently identifies one or more potential transactions related to the initial disputed transaction, provides a limited subset of the transactions related to the user account, and provides transactions that could have a bonafide and logical reason to be disputed with the initial transaction, users are restricted in how they can compile multiple transactions for dispute purposes. Hence, limiting the potential for fraud, and in particular, the ability of bad actors to scale fraudulent dispute requests.

In addition, while conventional systems are limited to single-transaction dispute requests due to technical limitations of the resolution processes of those systems, as described above, the multi-transaction dispute system can combine multiple transactions in a single dispute request. This can be accomplished by the multi-transaction dispute system through determining a dispute classification for the initial disputed transaction, analyzing metadata of one or more potential transactions, identifying the one or more potential transactions with a compatible dispute classification, and only providing a subset of potential transactions that can be processed through the same dispute resolution process as options to be combined with an initially disputed transaction. This results in the multi-transaction dispute system providing the capability of disputing multiple transactions at once but constraining the user to select from a list of potential transactions identified by the multi-transaction dispute system as compatible with the determined dispute classification.

Accordingly, because the multi-transactional dispute system can securely and reliably generate and process a multi-transaction dispute package, the multi-transactional dispute system is more efficient to conventional systems in a number of ways. For example, the multi-transaction dispute system increases the bandwidth to process transaction disputes and increases the processing power of the system and agent resources. In particular, as mentioned above, the intelligent identification of one or more potential transactions by the multi-transaction dispute system frees up the overall computational and processing power of the multi-transaction dispute system.

Additionally, the dispute classification, identifying potential transactions based on metadata and the dispute classification, and providing only a subset of potential transactions that can be processed through the same dispute resolution processes increases the multi-transaction dispute system's efficiency compared to conventional systems. This occurs because the total number of dispute requests the multi-transactional dispute system processes to resolve a given number of disputed transactions is fewer than conventional systems. Unlike conventional systems, multiple transactions can be combined into a single request. Indeed, the multi-transaction dispute system processes dispute requests with multiple transactions that the multi-transaction dispute system has identified as potentially related to the initial disputed transaction.

The multi-transaction dispute system also reduces unnecessary burdens on computational resources compared to conventional systems. For example, as previously mentioned, the intelligent identification of potential transactions reduces fraud while also freeing up the multi-transaction dispute system's computational resources. Furthermore, as also discussed above, by determining a dispute classification, analyzing metadata of potential transactions, and identifying potential transactions that are compatible with the dispute classification, the multi-transaction dispute system only provides potential transactions to the client device that can be processed together. This reduces unnecessary burdens on computational resources because the multi-transaction dispute system can process all of the selected additional disputed transactions together.

Moreover, the multi-transaction dispute system enjoys increased flexibility compared to conventional systems due to the multi-transaction dispute system's ability to combine multiple transactions into a multi-transaction dispute package. The multi-transaction dispute system's increased flexibility stems from the dispute classification, analyzing metadata with the dispute classification, and providing potential transactions to the client device that can be processed together. This inherently creates flexibility in the multi-transaction dispute system because the client device can append together multiple disputed transactions that are predetermined to be compatible with respect to a resolution process.

Furthermore, compared to conventional systems that require numerous user interactions to navigate several user interfaces to submit multiple transaction disputes, the multi-transactional dispute system provides a significantly improved user interface that allows a user to generate and submit a dispute request with a minimal number of user interactions. After the client device selects an initial disputed transaction, the multi-transaction dispute system determines a dispute classification for the initial disputed transaction, analyzes metadata of one or more potential transactions associated with the client account and allows for the client device to dispute one or more additional transactions. Packaging multiple transactions within the multi-transaction dispute package reduces the number of screens the user has to navigate to dispute multiple transactions. The multi-transaction dispute system no longer requires a separate dispute request for every single disputed transaction, rather, the user can now select an initial disputed transaction and be presented with multiple other potential transactions to dispute along with the initial disputed transaction. Furthermore, the multi-transaction dispute system's capability to identify the one or more potential transactions based on dispute classifications and analyzing metadata also reduces the number of screens and steps the user has to navigate, as will be further explained below with reference to FIGS. 6A-7C.

As indicated by the foregoing discussion, the present disclosure utilizes a variety of terms to describe features and advantages of the multi-transaction dispute system. For example, as used herein, the term "dispute request" refers to electronic data and/or an electronic communication that indicates a transaction(s) is under dispute. In particular, the term "dispute request" can be associated with different dispute reasons, such as, an unauthorized transaction(s), a duplicate transaction, an erroneous transaction(s), or a transaction(s) that a user believes is otherwise incorrect. In some embodiments, a client device can provide a dispute request to the multi-transaction dispute system regarding a recent ATM withdrawal(s) as erroneous. The dispute request can include data corresponding with a disputed transaction, for example, a merchant (and merchant information) associated with the disputed transaction, an amount of the disputed transaction, status of the disputed transaction (e.g., pending or settled), an indication of a dispute classification, the date and/or time of the disputed transaction, transaction identification numbers or codes, as well as any other metadata associated with the disputed transaction.

As just discussed, the dispute request includes information associated with an initial disputed transaction. As used herein, the term "initial disputed transaction" refers to a user-identified transaction that the client device associated with the user adds to a dispute request. To illustrate, the client device can provide for display to a user a list of recent transactions. Using the client device, a user can select a transaction from the list and generate a dispute request for the selected transaction. This first user-selected transaction is referred to herein as the initial disputed transaction.

As mentioned above, the multi-transaction dispute system intelligently identifies one or more potential transactions to possibly combine with the initial disputed transaction. As used herein, the term "potential transactions" refers to system-identified transactions from a digital account associated with a client device. The multi-transaction dispute system identifies a potential transaction as related with the initial disputed transaction. As explained further below, the term "potential transactions" can include transactions having metadata that indicates a potential relatedness to an initial disputed transaction based on, for example, a comparing of a transaction category, date, amount, merchant, dispute category, or a combination of transaction features. To illustrate, where the multi-transaction dispute system receives a dispute request that includes an initial disputed transaction of an online purchase on a particular date, the multi-transaction dispute system may identify other online purchases having the same date as "potential transactions."

As outlined above, the multi-transaction dispute system provides the one or more potential transactions to the client device and receives a selection of at least one additional disputed transaction. As used herein, the term "additional disputed transaction" refers to transactions that are combined with the initial disputed transaction within the same dispute request. To illustrate, the multi-transaction dispute system designates an online purchase on a particular date as the initial disputed transaction, and the multi-transaction dispute system identifies potential transactions of online purchases on the same date and provides the potential transactions for display on the client device. A user then uses the client device to select one or more additional disputed transaction(s) from the potential transactions, and in response to the selection, the multi-transaction dispute system combines the additional disputed transaction(s) with the initial disputed transaction within a multi-transaction dispute package.

As previously mentioned, the initial disputed transaction and at least one additional disputed transaction cause the multi-transaction dispute system to generate the multi-transaction dispute package. As used herein, the term "multi-transaction dispute package" refers to a dispute request sent to the multi-transaction dispute system that includes more than one disputed transaction. In particular, the "multi-transaction dispute package" contains an initial disputed transaction and one or more additional disputed transactions.

As mentioned, the multi-transaction dispute system identifies potential transactions by determining a dispute classification. As used herein, the term "dispute classification" refers to a category or class of dispute that relates to the reason for the dispute. In particular, the term "dispute classification" can include a generalization of what the multi-transaction dispute system deems as the best fit for the disputed transaction. In one or more embodiments, each dispute classification is associated with a dispute resolution pipeline or process.

As discussed above, the multi-transaction dispute system identifies potential transactions through analyzing metadata associated with each transaction. As used herein, the term "metadata" refers to information associated with a transaction. In particular, the term "metadata" can include merchant, merchant IDs, web IDs, date, transaction amount, etc. To illustrate, metadata can include an online retailer as the merchant, a merchant ID, a web ID, a date, a transaction amount of $97.38, or any other data or information known to be associated with digital transactions.

Additional detail regarding the multi-transaction dispute system will now be provided with reference to the figures. In particular, FIG. 1 illustrates a block diagram of a system environment for implementing a multi-transaction dispute system 102 in accordance with one or more embodiments. As shown in FIG. 1, the environment includes server(s) 106 implementing the multi-transaction dispute system 102 as part of an inter-network facilitation system 104. The environment of FIG. 1 further includes a client device 108, a device application 109, an agent device 114 and a secured account management system 110. The server(s) 106 can include one or more computing devices to implement the multi-transaction dispute system 102. Additional description regarding the illustrated computing devices (e.g., the server(s) 106, the client device 108, and/or the secured account management system 110) is provided with respect to FIGS. 9-10 below.

As shown, the multi-transaction dispute system 102 utilizes the network 112 to communicate with the client device 108, the agent device 114 and/or the secured account management system 110. The network 112 may comprise a network as described in relation to FIGS. 9-10. For example, the multi-transaction dispute system 102 communicates with the client device 108 to provide and receive information pertaining to various client transactions and communicates with the agent device 114 for processing disputes. Indeed, the inter-network facilitation system 104 or the multi-transaction dispute system 102 can generate a multi-transaction dispute package for further processing by the multi-transaction dispute system 102.

As described in greater detail below (e.g., in relation to FIG. 9), the inter-network facilitation system 104 can manage interactions across multiple devices, providers, and computer systems. For example, the inter-network facilitation system 104 can execute transactions across various third-party systems such as a banking entity, automated transaction machines, or payment providers. The inter-network facilitation system 104 can also maintain and manage digital accounts for client devices/users to store, manage, and/or transfer funds to other users.

To facilitate a multi-transaction dispute package, in some embodiments, the inter-network facilitation system 104 or the multi-transaction dispute system 102 communicates with the secured account management system 110. More specifically, the inter-network facilitation system 104 or the multi-transaction dispute system 102 determines the identity and permissions of the client device 108 by communicating with the secured account management system 110. The multi-transaction dispute system 102 can determine permissions of the client device 108 prior to disclosing secure information to the client device 108. For example, the inter-network facilitation system 104 or the multi-transaction dispute system 102 accesses a secured account maintained by the secured account management system 110 (e.g., remotely from the server(s) 106) and determines the last transaction within the secured account.

In one or more embodiments, the inter-network facilitation system 104 communicates with the secured account management system 110 in response to receiving identification information from the client device 108. In particular, the inter-network facilitation system 104 provides an indication of a secured account associated with a digital account to indicate that the client device 108 is authorized to receive information pertaining to the digital account. In addition, the inter-network facilitation system 104 communicates with the secured account management system 110 to determine permissions of the client device 108. For example, the inter-network facilitation system 104 provides information to the client device 108 such as direct deposit status, transaction information, digital account updates, device fee information, check status, interaction history, transaction status, activation, etc.

As indicated by FIG. 1, the client device 108 includes the device application 109. In particular, the device application 109 can include a web application, a native application installed on the client devices 108 (e.g., a mobile application, a desktop application, etc.), or a cloud-based application where all or part of the functionality is performed by the server(s) 106. In some embodiments, the inter-network facilitation system 104 or the multi-transaction dispute system 102 communicates with the client device 108 through the device application 109. This communication for example, receives and provides account information and transaction information including direct deposit status, digital account updates, device fee information, check status, interaction history, transaction status, activation, etc. As shown, the multi-transaction dispute system 102 can provide digital account information and secured account information for display within a graphical user interface associated with the device application 109.

As shown in FIG. 1, the client device 108 implements the device application 109 in conjunction with interaction with the inter-network facilitation system 104 or the multi-transaction dispute system 102. For example, the inter-network facilitation system 104 or the multi-transaction dispute system 102 can monitor the activities of the device application 109. In particular, these activities can include events such as time spent on device application 109, recently viewed pages on device application 109, recently viewed transaction on the device application 109, attempted dispute requests, etc.

Although FIG. 1 illustrates the environment having a particular number and arrangement of components associated with the multi-transaction dispute system 102, in some embodiments, the environment may include more or fewer components with varying configurations. For example, in some embodiments, the inter-network facilitation system 104 or the multi-transaction dispute system 102 can communicate directly with the client device 108, device application 109, and/or the secured account management system 110, bypassing the network 112. In these or other embodiments, the inter-network facilitation system 104 or the multi-transaction dispute system 102 can be implemented (entirely on in part) on the client device 108. Additionally, the inter-network facilitation system 104 or the multi-transaction dispute system 102 can include or communicate with a database for storing information, such as recent direct deposits, ATM withdrawals, debit, or credit transactions, pending transactions, digital account updates, interaction history, and/or other information described herein.

As discussed above, the multi-transaction dispute system 102 can interact with the client device 108 to generate a multi-transaction dispute package. For example, FIG. 2 illustrates an overview of the multi-transaction dispute system 102 receiving a dispute request 200, identifying one or more potential transactions 204 and generating a multi-transaction dispute package 208.

Figure 2:
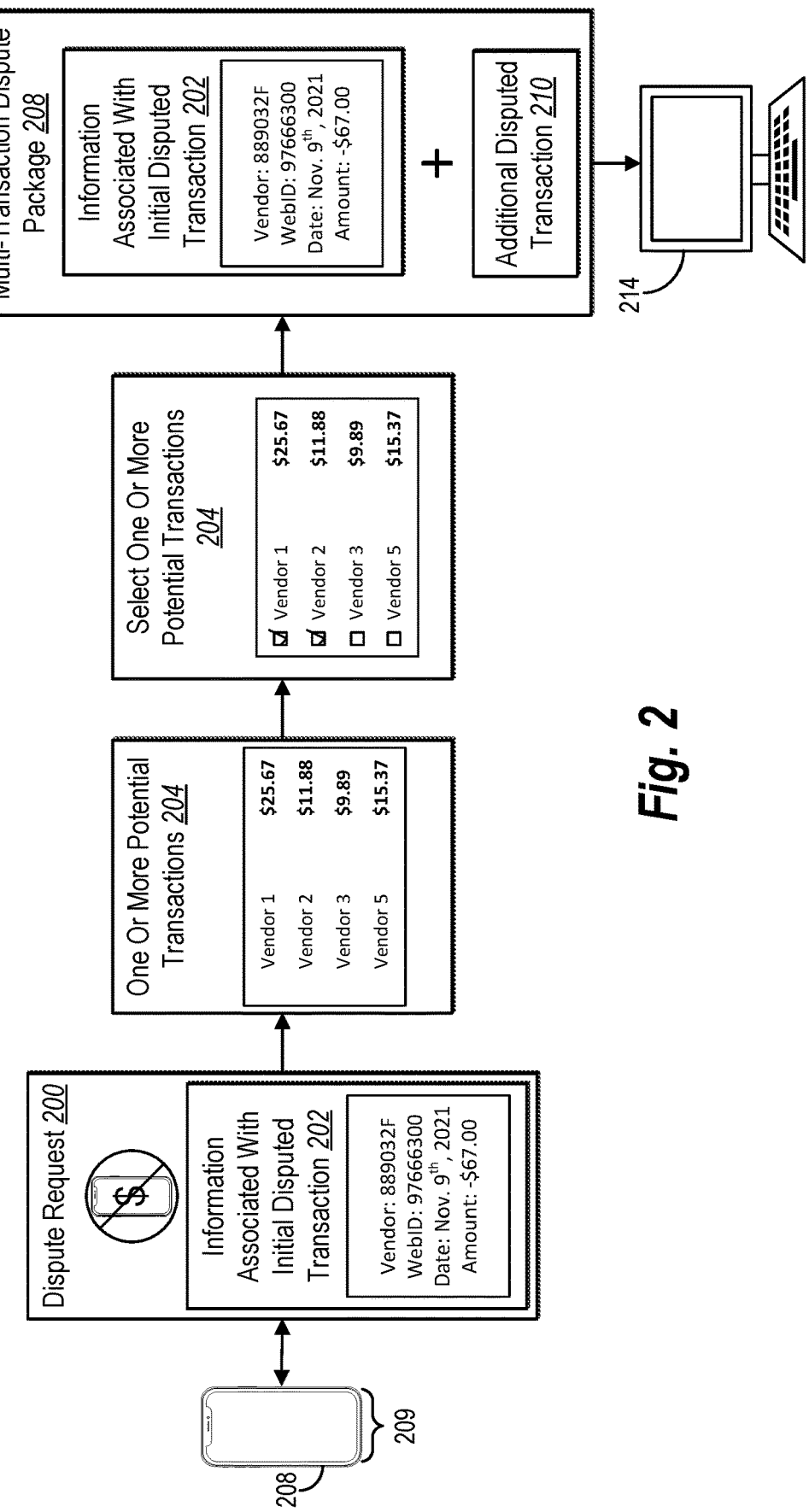
FIG. 2 illustrates an example diagram of a multi-transaction dispute system identifying one or more potential transactions in accordance with one or more embodiments.

More specifically, as illustrated in FIG. 2, the multi-transaction dispute system 102 receives the dispute request 200 from the client device 208, identifies the one or more potential transactions 204 from a digital account associated with the client device 208, provides a potential transaction list for display on the client device 208 to allow a user to select one or more potential transactions 204, and generates the multi-transaction dispute package 208. Upon receiving or completing the multi-transaction dispute package, the multi-transaction dispute system 102 processes the multi-transaction dispute package through a dispute resolution process (e.g., provides it to an agent device 214 or processes it using an automated resolution process).

As just mentioned, the multi-transaction dispute system 102 receives the dispute request 200 from the client device 208. As illustrated in FIG. 2, the dispute request 200 includes information associated with an initial disputed transaction 202. Information associated with the initial disputed transaction can include information included within the metadata of the transaction (e.g., vendor name, vendor ID, web ID, date, and transaction amount). Specific examples of the information associated with the initial disputed transaction 202 are further detailed in FIG. 3 and FIG. 4.

Upon receiving the dispute request 200, and as illustrated in FIG. 2, the multi-transaction dispute system 102 identifies the one or more potential transactions 204 based on the information associated with the received initial disputed transaction 202. The multi-transaction dispute system 102 identifies the one or more potential transactions 204 potentially related to the initial disputed transaction 202 based on comparing metadata associated with the initial disputed transaction with metadata associated with transactions within the user account. The details for how the multi-transaction dispute system 102 identifies one or more potential transactions 204 is discussed in more detail below in FIG. 3 and FIG. 4.

Subsequent to identifying the potential transactions 204, the multi-transaction dispute system provides the potential transactions 204 to the client device 208 for display to allow a user to have an option to select a transaction from the list of potential transactions 204, as shown in FIG. 2. The client device 208 can receive a selection of one or more transactions from the potential transactions 204 to combine with the initial disputed transaction. This indicates to the multi-transaction dispute system 102 the relevance of the one or more potential transactions 204. Additional details about selecting the one or more potential transactions 204 is further discussed in FIG. 6F.

Moreover, and as illustrated in FIG. 2, the multi-transaction dispute system 102 receives from the client device 208, an indication of selection of one or more potential transactions 204 and generates the multi-transaction dispute package 208. The multi-transaction dispute package 208 includes information associated with the initial disputed transaction 202 and information associated with at least one additional disputed transaction 210. The multi-transaction dispute system 102 further processes the multi-transaction dispute package 208 within a dispute resolution process. Additional details regarding the dispute resolution process is given in FIG. 5. While undergoing the dispute resolution process of the multi-transaction dispute package 208, the multi-transaction dispute system 102 provides status updates for each transaction within the multi-transaction dispute package. In one or more embodiments, the multi-transaction dispute system 102 generates and provides a timeline graphical user interface to the client device 208 that displays resolution events associated with the disputed transactions. Status updates will be discussed in more detail in FIG. 7A-7C.

Figure 3:
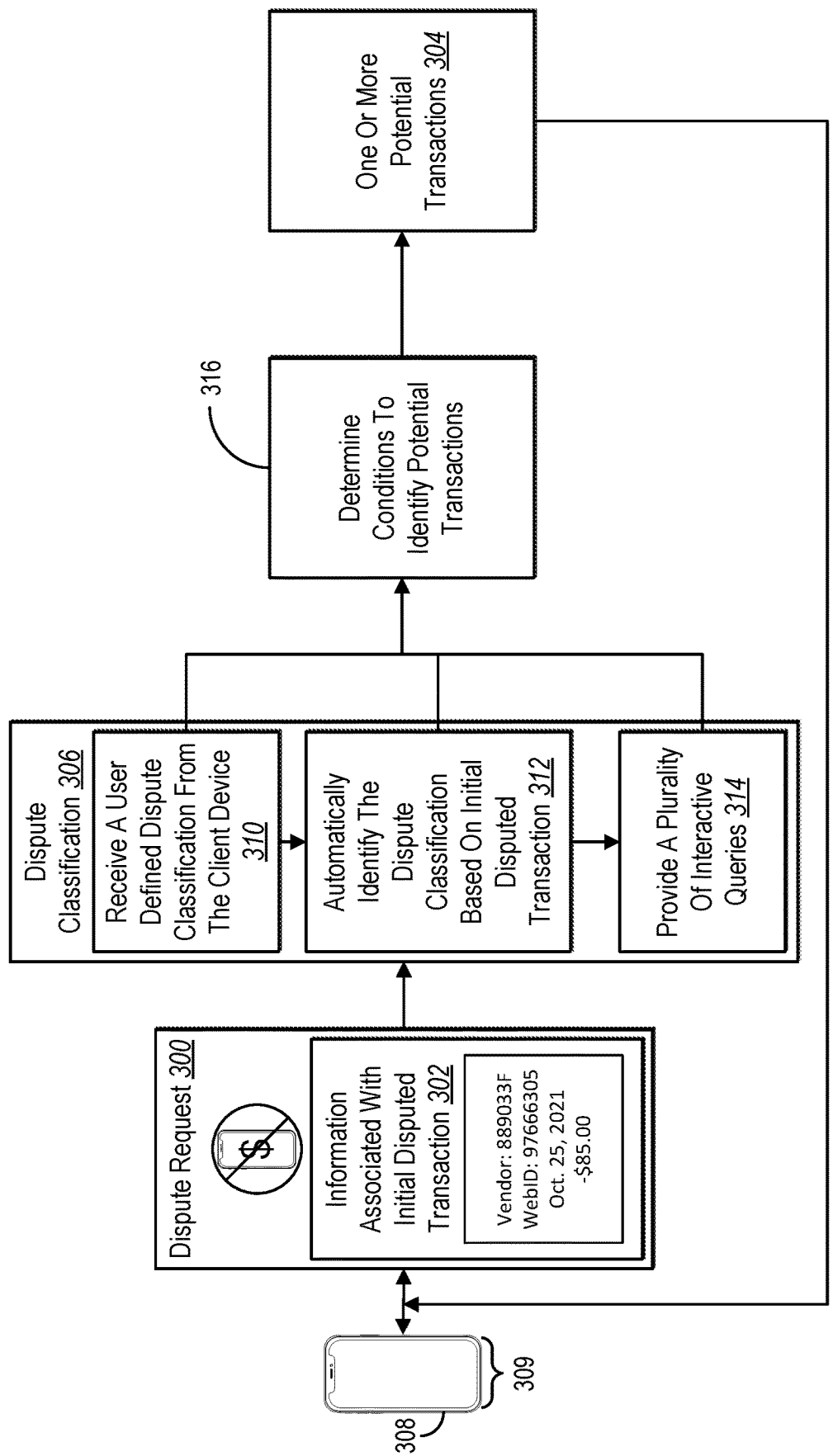
FIG. 3 illustrates an example diagram of a multi-transaction dispute system determining a dispute classification based on an initial disputed transaction in accordance with one or more embodiments.

As previously mentioned, the multi-transaction dispute system 102 identifies the one or more potential transactions 204. As illustrated in FIG. 3, the multi-transaction dispute system 102 can identify one or more potential transactions 304 via utilizing a dispute classification 306. More specifically, FIG. 3 illustrates the multi-transaction dispute system 102 performing an act 310 of receiving a user defined dispute classification 306 from the client device 308 with device application 309, performing an act 312 of automatically identifying the dispute classification 306 based on initial disputed transaction 302, or an act 314 of providing a plurality of interactive queries. Subsequently, the multi-transaction dispute system 102 performs act 316 of determining conditions to identify potential transactions and provides the one or more potential transactions 304 identified to the client device 308.

A dispute request 300 includes information associated with the initial disputed transaction 302. When the multi-transaction dispute system 102 receives the dispute request 300, it includes the information associated with initial disputed transaction 302. Specifically, the information associated with initial disputed transaction 302 can include a vendor, webID, date, and transaction amount. As illustrated in FIG. 3, the multi-transaction dispute system identifies the vendor with an ID such as 889033F. This vendor ID correlates with a vendor, such as a gas station, in the multi-transaction dispute system 102 database. While the webID can generally relate to the HTTP or website corresponding with the initial disputed transaction 302. The webID and vendorID can point to the same source. The multi-transaction dispute system 102 also associates the date and transaction amount with the initial disputed transaction 302.

The dispute request 300 received by the multi-transaction dispute system 102 can involve a variety of dispute types. For example, the multi-transaction dispute system 102 receives dispute filings for ACH, ATM, debit, credit, and pending transactions. Depending on the type of dispute filing received by the multi-transaction dispute system 102, the information associated with the initial disputed transaction 302 varies. FIG. 3 illustrates example embodiments of debit or credit transactions for information associated with initial disputed transaction 302.

In particular, if the dispute request 300 involves an ATM withdrawal, the information associated with the initial disputed transaction 302 may include time of withdrawal, location of withdrawal, withdrawal amount, and date of withdrawal. If the dispute request 300 involves an ACH transfer, the information associated with the initial disputed transaction 302 may include ACH transaction recipient, account and routing number associated with ACH transaction, and date of ACH transaction. If the dispute request 300 involves a pending transaction, the type of pending transaction (ACH, ATM, debit, or credit) determines the information associated with the initial disputed transaction 302.

As mentioned above, the multi-transaction dispute system 102 utilizes the dispute classification 306 to identify one or more potential transactions 304. The multi-transaction dispute system 102 receives the dispute request 300 and determines the dispute classification 306 based on the information associated with initial disputed transaction 302. For example, the dispute classification 306 can fall in one of the following categories: an unauthorized transaction, non-receipt, a device malfunction, a cancelled transaction, non-matching description, unauthorized external transfer, or a duplicate transaction. A more specific discussion of the relationship between dispute requests, the dispute classification 306 and corresponding restrictions, is detailed in FIG. 6A-6G.

Continuing with the discussion regarding dispute classification 306, the multi-transaction dispute system 102 can determine the dispute classification 306 in a variety of ways. For example, the multi-transaction dispute system 102 can utilize a hierarchy of methods to determine the dispute classification 306. In particular, the multi-transaction dispute system 102 can perform the act 310 of receiving a user defined dispute classification 306 from the client device 308. In this situation, the client device 308 (based on user interaction) designates the dispute classification 306 in the process of sending the dispute request 300 to the multi-transaction dispute system 102.

If the multi-transaction dispute system 102 does not receive the user-defined dispute classification 306 from the client device 308, then the multi-transaction dispute system 102 can perform the act 312 of automatically identifying the dispute classification 306 based on the initial disputed transaction 302. This automatic determination made by the multi-transaction dispute system 102 can involve machine learning models or heuristic models (e.g., rule-based models).

In one or more embodiments, the multi-transaction dispute system uses a machine learning model. As used herein, the term "machine learning model" refers to a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness. Example machine learning models include various types of decision trees, support vector machines, Bayesian networks, linear regressions, logistic regressions, random forest models, or neural networks (e.g., deep neural networks).

In particular, the multi-transaction dispute system 102 can utilize the machine learning model to analyze the dispute request 300 and the information associated with initial disputed transaction 302. For example, the multi-transaction dispute system 102 can encode the dispute request 300 and/or the information associated with initial disputed transaction 302 (e.g., using one hot encoding, an encoding layer, or a vector mapping) and then process the encoding utilizing the machine learning model.

The multi-transaction dispute system 102 can utilize a variety of machine learning models to analyze the dispute request 300 and/or the information associated with initial disputed transaction 302. With regard to the multi-transaction dispute system 102 automatically determining the dispute classification 306, in one embodiment the machine learning model is a decision tree, such as a random forest model or a boosted gradient decision tree. Accordingly, the multi-transaction dispute system 102 feeds the dispute request 300 and/or the information associated with initial disputed transaction 302 to input channels of the random forest model. The random forest model then utilizes learned nodes within one or more decision trees to generate the dispute classification 306. In other implementations the multi-transaction dispute system 102 can utilize a neural network, such as a convolutional neural network, or other machine learning model to process the dispute request 300 and/or the information associated with initial disputed transaction 302.

Alternatively, the multi-transaction dispute system 102 can utilize a heuristic model to automatically determine the dispute classification 306. As used herein, the term "heuristic model" refers to a set of pre-established rules applied by the multi-transaction dispute system 102. In particular, the term "heuristic model" can include criteria for identifying potential transactions. To illustrate, the multi-transaction dispute system 102 applies a specific rule to identify one or more potential transactions 304 as all transactions from the same merchant within an amount range of the amount of the initial disputed transaction 302. The heuristic model can include a set of pre-established rules for the information associated with initial disputed transaction 302.

When the multi-transaction dispute system 102 determines that the rules of the heuristic model are satisfied, the multi-transaction dispute system 102 automatically classifies the dispute request 300. For example, based on the heuristic model, when the dispute request 300 includes a transaction with the vendor, webID, amount, and date exactly matching that of another transaction corresponding to the client device's 308 client account, then the multi-transaction dispute system 102 can determine the dispute classification 306 as duplicate transaction.

Whereas, if the multi-transaction dispute system 102 cannot automatically determine the dispute classification 306 based on the machine learning model or heuristic model, then the multi-transaction dispute system 102 can perform the act 314 of providing a plurality of interactive queries to the client device 308. The multi-transaction dispute system 102 can use interactive queries to determine the dispute classification 306. As used herein, the term "interactive queries" refers to a series of questions or statements presented to the client device. In particular, the term "interactive queries" can include a series of questions that changes depending on how the client device 308 responds. To illustrate, interactive queries can include the multi-transaction dispute system 102 asking the client device "have you contacted the merchant?" or "what kind of purchases did you make?"

The multi-transaction dispute system 102 can determine the dispute classification 306 based on responses to the plurality of interactive queries. The act 314 of providing the plurality of interactive queries, assists the multi-transaction dispute system 102 in homing in on the dispute classification 306 for the dispute request 300. For example, the multi-transaction dispute system 102 can perform the act 314 of providing the plurality of interactive queries after the client device 308 has indicated to the multi-transaction dispute system 102 that the dispute request 300 involves one or more potential transactions 304. Or the multi-transaction dispute system 102 can perform the act 314 of providing the plurality of interactive queries right after the client device 308 selects the initial disputed transaction 302. Depending on the initial disputed transaction 302, the multi-transaction dispute system 102 may use a different flow of interactive queries to determine the dispute classification 306. Further examples of performing the act 314 of providing the plurality of interactive queries and different operation flows is given in more detail in FIG. 6G.

Based on determining the dispute classification 306 through one of the methods mentioned above, the multi-transaction dispute system 102 performs the act 316 of determining conditions to identify potential transactions. Essentially, the multi-transaction dispute system 102 can utilize the dispute classification 306 to then specify relevant conditions to apply to all of the client device's 308 account transactions. For example, the multi-transaction dispute system 102 determines a condition for unauthorized transactions as having "taken place in the last 30 days." While the multi-transaction dispute system 102 determines a second condition for unauthorized transactions as including "not limited to one merchant." In particular, the multi-transaction dispute system 102 takes the just mentioned conditions and applies them to the client account transactions. This results in identifying one or more potential transactions 304 and providing them to the client device 308. More details relating to dispute classifications and conditions is discussed in FIG. 4.

Although FIG. 3 illustrates the method of determining the dispute classification 306 as a hierarchy, determining the dispute classification 306 can occur in a variety of ways. For example, the multi-transaction dispute system 102 can default to the act 312 of automatically identifying the dispute classification 306 based on initial disputed transaction 302. In particular, the multi-transaction dispute system 102 would not need to perform the act 310 of receiving the user defined dispute classification 306 from the client device 308 and instead would directly determine the dispute classification 306. As discussed above, the automatic determination of the dispute classification 306 would utilize machine learning models or heuristic models upon receiving the dispute request 300. Furthermore, the multi-transaction dispute system 102 can utilize a combination of machine learning models and heuristic models to make this automatic determination.

In another example embodiment, the multi-transaction dispute system 102 defaults to performing the act 314 of providing the plurality of interactive queries to the client device 308. In particular, the multi-transaction dispute system 102 does not utilize the machine learning models or heuristic models, but by default relies on responses to the plurality of interactive queries. While in other example embodiments, the multi-transaction dispute system 102 first relies on the act 310 of receiving the user defined dispute classification 306 from the client device 308 and if that fails, then the multi-transaction dispute system 102 performs the act 314 of providing the plurality of interactive queries to the client device 308.

Moreover, the multi-transaction dispute system 102 can use intelligent detection to select the method of determining the dispute classification 306. For example, the multi-transaction dispute system 102 intelligently balances the different methods of determining dispute classification 306 with the information associated with initial disputed transaction 302 and/or the dispute request 300. Based on specific information associated with initial disputed transaction 302, the multi-transaction dispute system 102 can intelligently determine the most appropriate method of the three discussed methods. In particular, if the information associated with initial disputed transaction 302 indicates an ATM withdrawal, the multi-transaction dispute system 102 may determine that the act 314 of providing a plurality of interactive queries would expedite determining the dispute classification 306.

Figure 4:
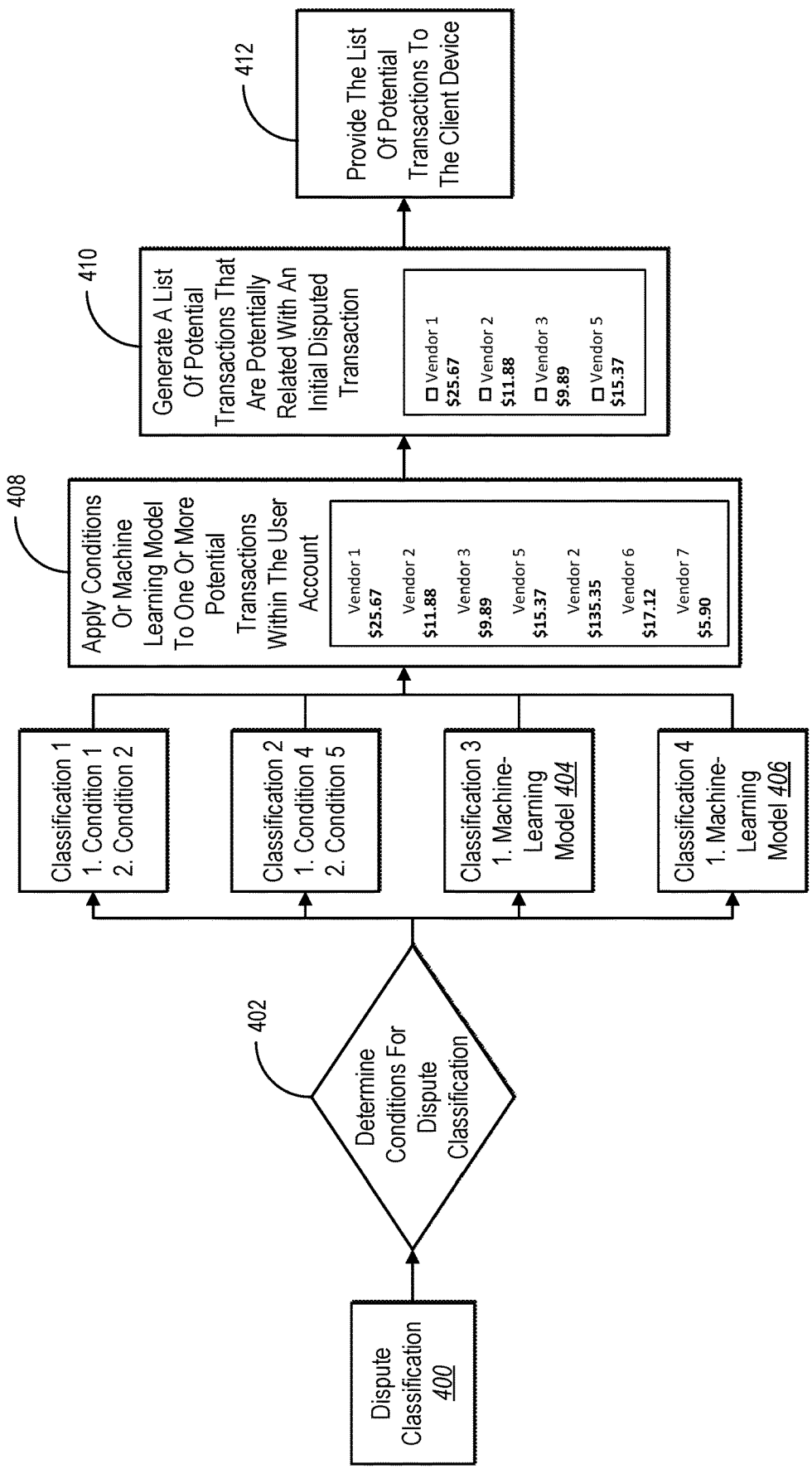
FIG. 4 illustrates an example diagram of a multi-transaction dispute system determining conditions for a dispute classification and applying those conditions in accordance with one or more embodiments.

As discussed previously, the multi-transaction dispute system 102 identifies one or more potential transactions 304 within the user account. As illustrated in FIG. 4, after the multi-transaction dispute system 102 identifies a dispute classification 400, the multi-transaction dispute system 102 performs an act 402 of determining conditions for the dispute classification 400 and performs an act 410 of generating a list of potential transactions and an act 412 of providing the list of potential transactions to a client device (e.g., the client device 308 as discussed in FIG. 3).

Specifically, FIG. 4 illustrates, identifying the dispute classification 400, performing the act 402 of determining conditions for the dispute classification 400, performing the act 408 of applying conditions to one or more potential transactions within the user account, performing the act 410 of generating a list of potential transactions 410 that are potentially related with an initial disputed transaction, and performing the act 412 of providing the list of potential transactions to the client device.

For instance, in an example embodiment, the multi-transaction dispute system 102 analyzes metadata of the dispute request (e.g., the dispute request 300 as discussed with reference to FIG. 3) to determine the dispute classification 400. As mentioned previously, the multi-transaction dispute system 102 can consider as metadata the vendor, webID, date, transaction amount, location, transaction recipient, and other information. By analyzing the metadata, the multi-transaction dispute system 102 can determine via machine learning models, heuristic models, or a combination of the machine learning model and heuristic model, the most appropriate dispute classification 400.

After determining the dispute classification 400, the multi-transaction dispute system 102 performs the act 402 of determining conditions for the dispute classification 400. The conditions identified by the multi-transaction dispute system 102 correlate with the dispute classification 400. Each dispute classification 400 can have a single condition, multiple conditions, and some conditions for dispute classifications overlap with other dispute classification conditions. For instance, FIG. 4 illustrates classification 1 with two corresponding conditions (1 and 2). In particular if the multi-transaction dispute system 102 determines the initial disputed transaction corresponds to classification 1 (e.g., an "unauthorized transaction" classification) conditions 1 and 2 can include: (1) a relevant time frame of when the unauthorized transaction may have taken place, such as within the last week; and (2) do not restrict to one merchant/vendor. Whereas if the multi-transaction dispute system 102 determines the initial disputed transaction has corresponds to classification 2 (e.g., as "non-receipt of goods") conditions 4 and 5 can include: (4) all transactions in the last week with the same webID; and (5) a price range between $50.00 and $150.00. Accordingly, the dispute classification 400 determined from the initial disputed transaction is used to determine conditions (e.g., rules and/or attributes) that the system 102 uses to identify one or more potential transactions from transactions within the user account.

In addition to the above, and as another example, if the multi-transaction dispute system 102 classifies the initial disputed transaction as "device malfunction," then the corresponding conditions can include: (1) one specific date; and (2) a specific vendor ID. If the multi-transaction dispute system 102 classifies the initial disputed transaction as "a cancelled transaction," then the corresponding conditions can include: (1) same vendor ID; (2) same webID; and (3) same date. If the multi-transaction dispute system 102 classifies the initial disputed transaction as "non-matching description of goods received," then the corresponding conditions can include: (1) same transaction amount; and (2) same vendor ID. If the multi-transaction dispute system 102 classifies the initial disputed transaction as "unauthorized external transfer," then the corresponding conditions can include: (1) transaction recipient; and (2) a relevant time frame for the unauthorized external transfer. While the above are examples of dispute classifications and conditions, it should be understood that generally speaking, the system 102 can utilize a determined dispute classification to identify one or more conditions representing transaction attributes, and then the system 102 can use the transaction attributes to identity the potential transactions.

While the multi-transaction dispute system 102 can associate conditions with dispute classifications, the multi-transaction dispute system 102 can also utilize machine-learning models 404 and 406. For example, and as shown in FIG. 4, after determining the dispute classification 400, the multi-transaction dispute system can determine that a machine learning model 404 or 406 can best assist in identifying one or more potential transactions (e.g., the one or more potential transactions 304 as discussed with reference to FIG. 3). In particular, the multi-transaction dispute system 102 utilizes either machine learning model 404 or 406 to encode the dispute classification 400 (e.g., using one hot encoding, an encoding layer, or a vector mapping) and then processes the encoding utilizing the machine learning model 404 or 406. The principles of the machine learning model encoding were discussed previously in FIG. 3, and similarly applies here.

After either determining conditions or identifying a machine learning model based on a dispute classification, the multi-transaction dispute system 102 performs the act 408 of applying the machine learning model 404 or 406 to the one or more potential transactions within the user account which results in identifying the one or more potential transactions related with the initial disputed transaction (e.g., the initial disputed transaction 302 as discussed with reference to FIG. 3). For example, the multi-transaction dispute system 102 associates the dispute classifications with conditions and likewise can associate the dispute classifications with different machine learning models 404 and 406. For example, the multi-transaction dispute system 102 can determine the dispute classification 400 as "unauthorized transaction." The multi-transaction dispute system 102 can then apply a machine learning model to find all potential transactions within the user account that seem unauthorized based on machine learning model principles, as previously discussed in FIG. 3.

The multi-transaction dispute system 102 can intelligently determine whether to apply conditions or the machine learning models 404 or 406 to the one or more potential transactions within the user account. For example, the multi-transaction dispute system 102 can designate specific dispute classifications to default applying the machine learning model 404 or 406, while other dispute classifications default to applying conditions. Additionally, the multi-transaction dispute system 102 can determine whether to apply the machine learning models 404/406 or conditions, based on historical accuracy of doing one or the other.

After performing the act 408 of applying the conditions or machine learning models 404/406 to the one or more potential transactions within the user account, the multi-transaction dispute system 102 performs the act 410 of generating a list of potential transactions that are potentially related with the initial disputed transaction. Subsequently the multi-transaction dispute system 102 performs the act 412 of providing the list of potential transactions to the client device.

While FIG. 4 illustrates the act 410 of generating a list of potential transactions and the act 412 of providing the list of potential transactions to the client device, the multi-transaction dispute system 102 can upon performing the act 408 of applying conditions or the machine learning models, determine to bypass a client device selection of an additional disputed transaction (e.g., the additional disputed transaction 210 as discussed with reference to FIG. 2), and automatically designate one or more potential transactions as the additional disputed transaction. This alternative example embodiment can occur based on a high degree of confidence by the multi-transaction dispute system 102 according to a confidence score associated with the conditions or machine learning models.

Figure 5:
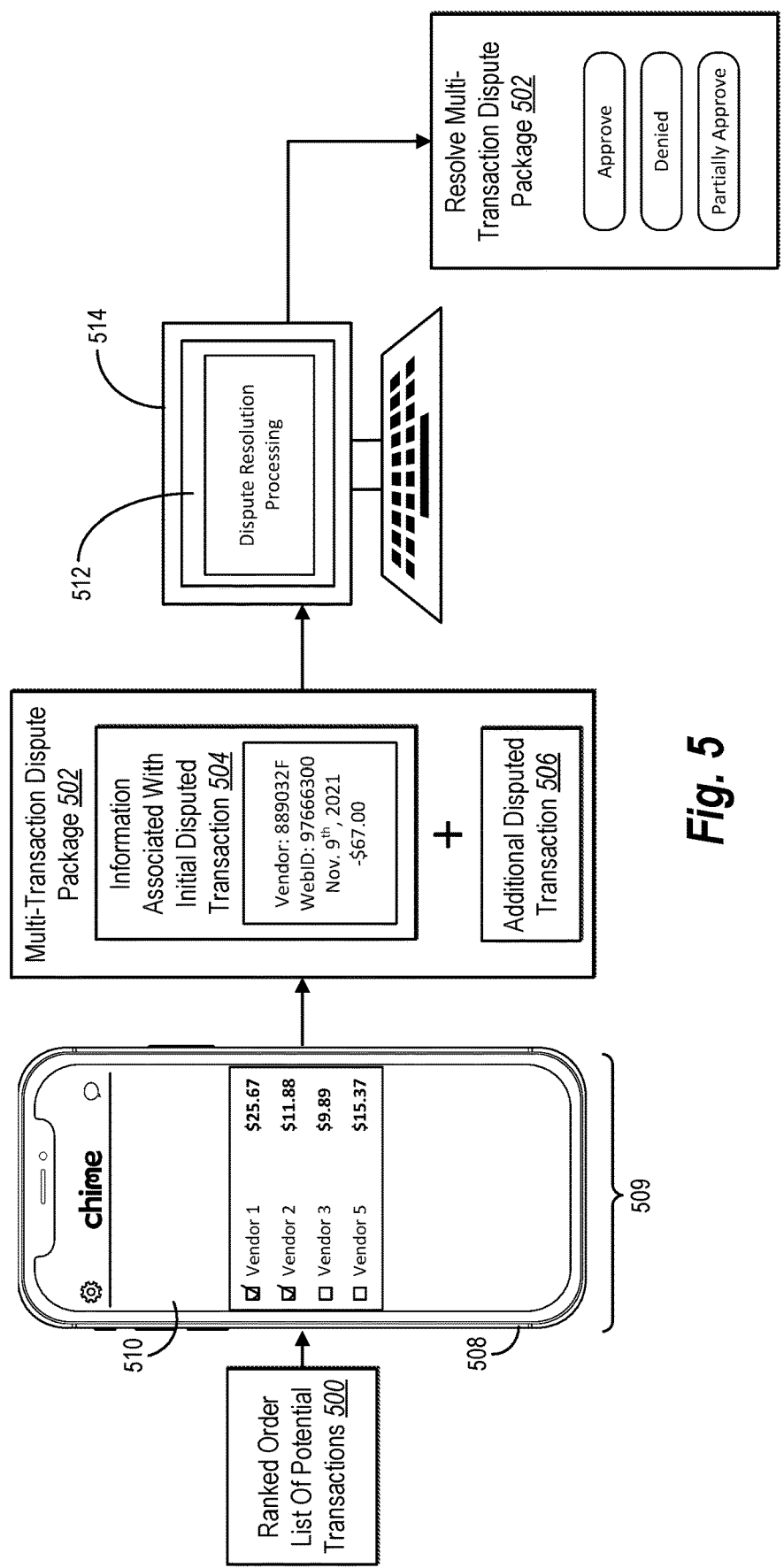
FIG. 5 illustrates an example diagram of a multi-transaction dispute system using a ranked order list of potential transactions to generate a multi-transaction dispute package in accordance with one or more embodiments.

As mentioned above, the multi-transaction dispute system 102 performs the act 412 of providing the list of potential transactions to the client device. As illustrated in FIG. 5, the multi-transaction dispute system 102 provides a ranked order list of potential transactions 500 to a client device 508 and generates a multi-transaction dispute package 502 for processing. Specifically, FIG. 5 illustrates the ranked order list of potential transactions 500, generating the multi-transaction dispute package 502, dispute resolution processing, and resolving the multi-transaction dispute package 502. For example, the multi-transaction dispute system 102 creates the ranked order list of potential transactions 500 by utilizing at least one of a machine learning model or a heuristic model. The multi-transaction dispute system 102 provides the ranked order list of potential transactions 500 to the client device 508 and device application 509 to display on a graphical user interface 510. The ranked order list of potential transactions 500, includes a display on the graphical user interface 510 of the client device 508 in a manner deemed most relevant to the client device 508. Providing the ranked order list of potential transactions 500 allows the client device 508 to view and select an additional disputed transaction 506.

As mentioned, the machine learning model or heuristic model utilized by the multi-transaction dispute system 102 were discussed in detail above in FIGS. 3 and 4. As applied here, the multi-transaction dispute system 102 utilizes the machine learning model on the identified one or more potential transactions (e.g., the one or more potential transactions 304 as discussed with reference to FIG. 3) to determine the ranked order list of potential transactions 500. The machine learning model can identify highly unlikely purchases within the user account and rank order in terms of unlikeliness. While the heuristic model can apply rules to the one or more potential transactions such as ordering the one or more potential transactions in terms of recency.

After receiving a selection of the additional disputed transaction 506, the multi-transaction dispute system 102 generates the multi-transaction dispute package 502. The multi-transaction dispute package 502 includes information associated with initial disputed transaction 504 and the additional disputed transaction 506. The additional disputed transaction 500 can include one or more additional transactions.

Subsequent to generating the multi-transaction dispute package 502, the multi-transaction dispute system 102 sends the multi-transaction dispute package 502 to an agent device 514 for dispute resolution processing. A graphical user interface 512 of the agent device 514 displays the multi-transaction dispute package 502. The agent device 514 processes the multi-transaction dispute package 502 until it is resolved (e.g., dispute resolution processing). For example, the agent device 514, receives the entire multi-transaction dispute package 502 which includes the details of each transaction within the multi-transaction dispute package 502. In particular, the agent device 514 can view the dispute classification (e.g., the dispute classification 400 as discussed with reference to FIG. 4) of the initial disputed transaction 504, and the conditions or machine learning model applied to identify the one or more potential transactions (e.g., as discussed in FIG. 4). Furthermore, the agent device 514 can view the process in which the multi-transaction dispute system 102 determined the dispute classification. This could include the plurality of interactive queries provided to the client device 508 (e.g., the act 314 of providing a plurality of interactive queries as discussed with reference to FIG. 3) and the responses to the plurality of interactive queries.

After the agent device 514 (or other resolution process within system 102) has finished processing the multi-transaction dispute package 502, the client device 508 will receive a notification regarding the status of the multi-transaction dispute package 502. For example, the status of the multi-transaction dispute package 502 can include approved, denied, or partially approved. In particular, partially approved indicates that the multi-transaction dispute system 102 deems at least one of the transactions in the multi-transaction dispute package 502 as approved while at least one has been denied. While, approved indicates that the multi-transaction dispute system 102 deems all transactions in the multi-transaction dispute package 502 as approved. Denied indicates that the multi-transaction dispute system 102 deems all transactions in the multi-transaction dispute package 502 as denied. Details regarding intermediate notifications while the agent device 514 is processing the multi-transaction dispute package 502 is discussed in FIG. 7A-7C.

Although FIG. 5 illustrates the agent device 514 receiving the multi-transaction dispute package 502, the multi-transaction dispute system 102 can bypass the agent device 514 and automatically process the multi-transaction dispute package 502. In other words, the multi-transaction system 102 is not required to rely on the agent device 514 for dispute resolution processing. The multi-transaction dispute system 102 can bypass the agent device 514 when it determines with a high degree of confidence that the multi-transaction dispute package 502 should be approved, denied, or partially approved. This further allows the multi-transaction dispute system 102 to expedite issues, increase efficiency of the system, and decrease overall computational and processing burdens.

In other example embodiments, the multi-transaction dispute system 102 does not provide a ranked order list of potential transactions 500, but rather presents a list of potential transactions in the order the multi-transaction dispute system 102 identified the potential transactions.

As previously mentioned in FIG. 3, the multi-transaction dispute system 102 can receive a variety of dispute types for the dispute request 200. This variety of dispute types typically depends upon the initial disputed transaction (e.g., the initial disputed transaction 504 as discussed with reference to FIG. 5). As illustrated in FIG. 6A, a graphical user interface 600 displays a variety of transactions that may be associated with different dispute types. Specifically, FIG. 6A illustrates a client device 608 with device application 609 and the graphical user interface 600 that displays a spending account for the client device 608.

For example, FIG. 6A illustrates on the graphical user interface 600 of the client device 608, a date 602 for the transactions associated with the spending account. In particular, the multi-transaction dispute system 102 can use the date 602 as part of the metadata and use that to identify one or more potential transactions (e.g., the one or more potential transactions 304 as discussed with reference to FIG. 3).

The multi-transaction dispute system 102 also utilizes the type of dispute with the date. As illustrated, the graphical user interface 600 displays a debit transaction 604. In this situation, the multi-transaction dispute system 102 recognizes the dispute type as debit. As shown, this debit transaction 604 indicates that the multi-transaction dispute system 102 associates the transaction with "gas station." The multi-transaction dispute system 102 can associate gas station as the vendor ID and use that to identify one or more potential transactions.

Additionally, FIG. 6A illustrates an ACH transfer 610 associated with the spending account. The ACH transfer indicates a transfer amount of $125.00. As just mentioned, this multi-transaction dispute system 102 can also use this as metadata. Moreover, FIG. 6A illustrates ATM withdrawal 612 and another debit transaction 606 as "online shopping." For example, the debit transaction 606 can vary from the debit transaction 604 due to the debit transaction 606 having a webID while the debit transaction 604 does not. Although FIG. 6A illustrates debit transactions 604 and 606, in a different example embodiment of the device application 609, debit transactions 604 and 606 could represent credit transactions.

Figure 6B:
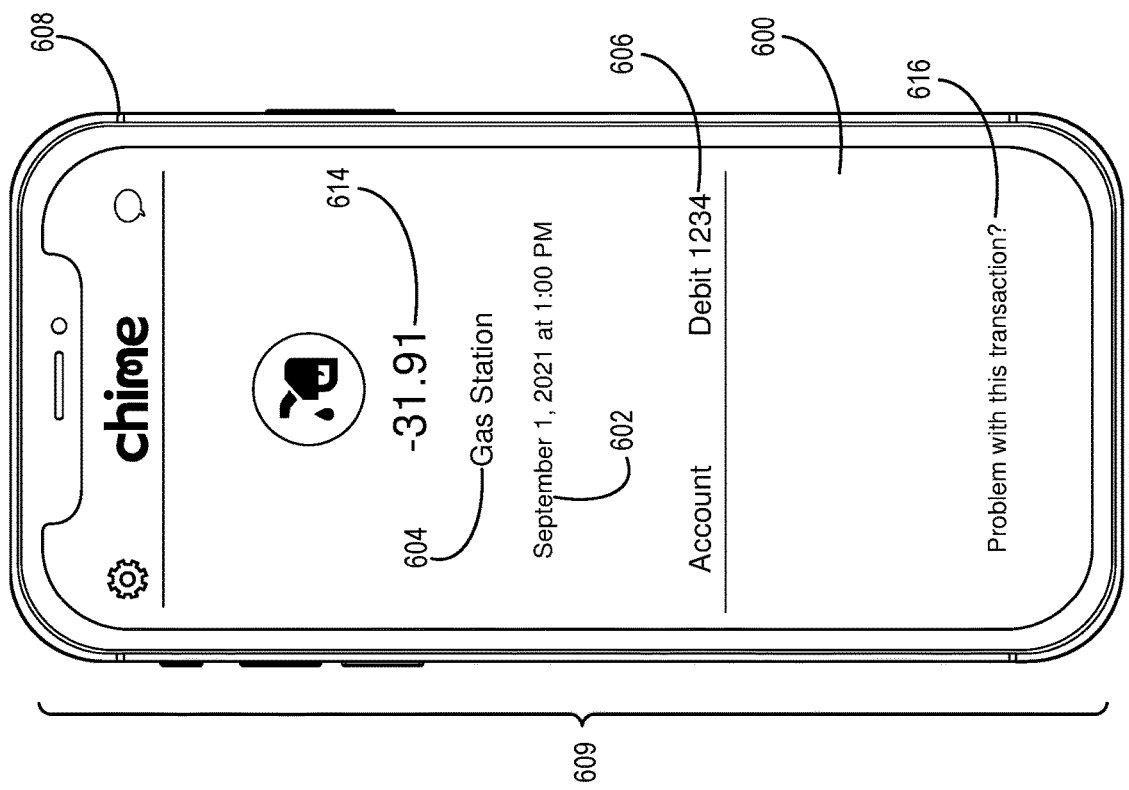
FIGS. 6A-6G illustrate an example graphical user interface on a client device relating to a selection of at least one additional disputed transaction in accordance with one or more embodiments.
Figure 6A:
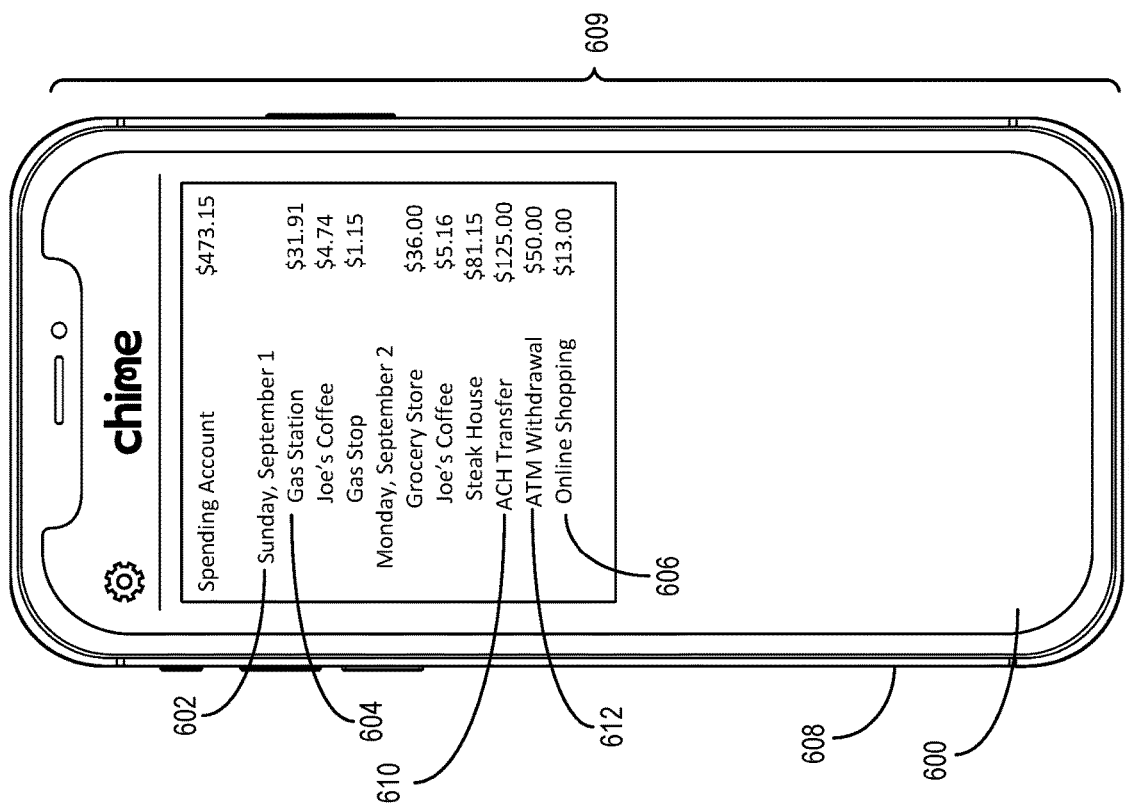

FIG. 6B illustrates the client device 608 with the device application 609 displaying on the graphical user interface 600 the debit transaction 604. Specifically, FIG. 6B illustrates the details of the debit transaction 604: a transaction amount 614, a debit account number 606, and an indication 616 of potentially disputing the debit transaction 604.

To initiate the graphical user interface 600 displayed in FIG. 6B, the multi-transaction dispute system 102 receives a selection of the debit transaction 604 in FIG. 6A and shows it in more detail as shown in FIG. 6B. For example, after selecting debit transaction 604, the graphical user interface 600 displays high-level information and gives the option to indicate 616, a "problem with the transaction." While the graphical user interface 600 specifically shows the debit transaction 604, the graphical user interface 600 in FIG. 6B can display any type of dispute request (ACH, ATM, debit, credit, pending).

Figure 6D:
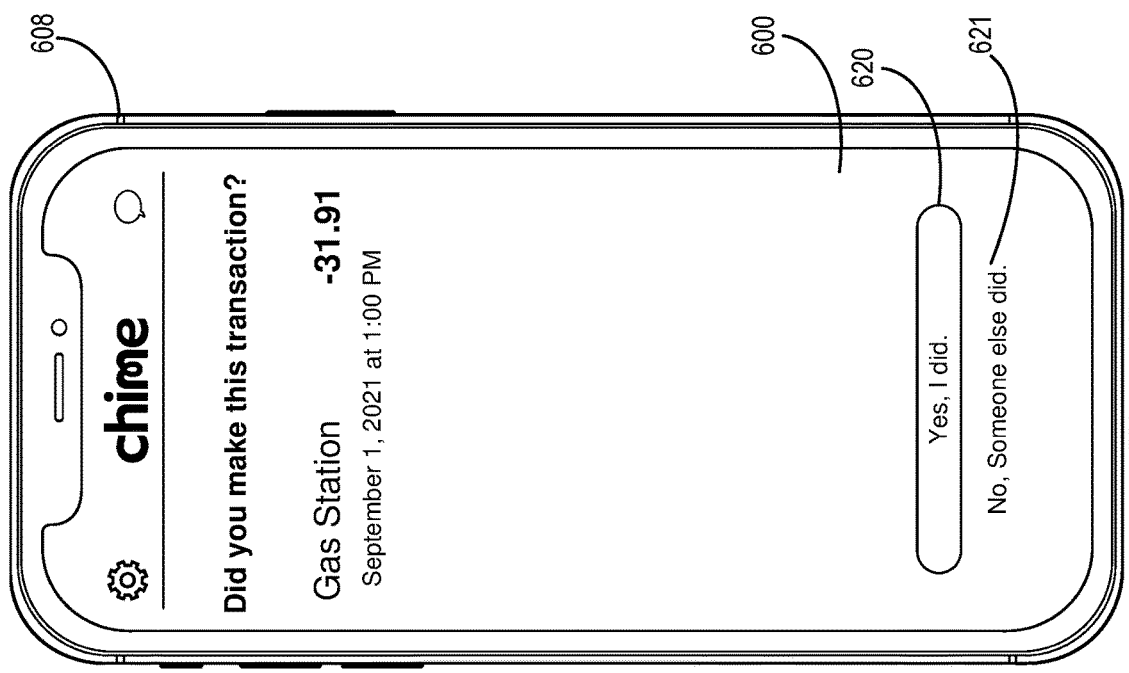
Figure 6C:
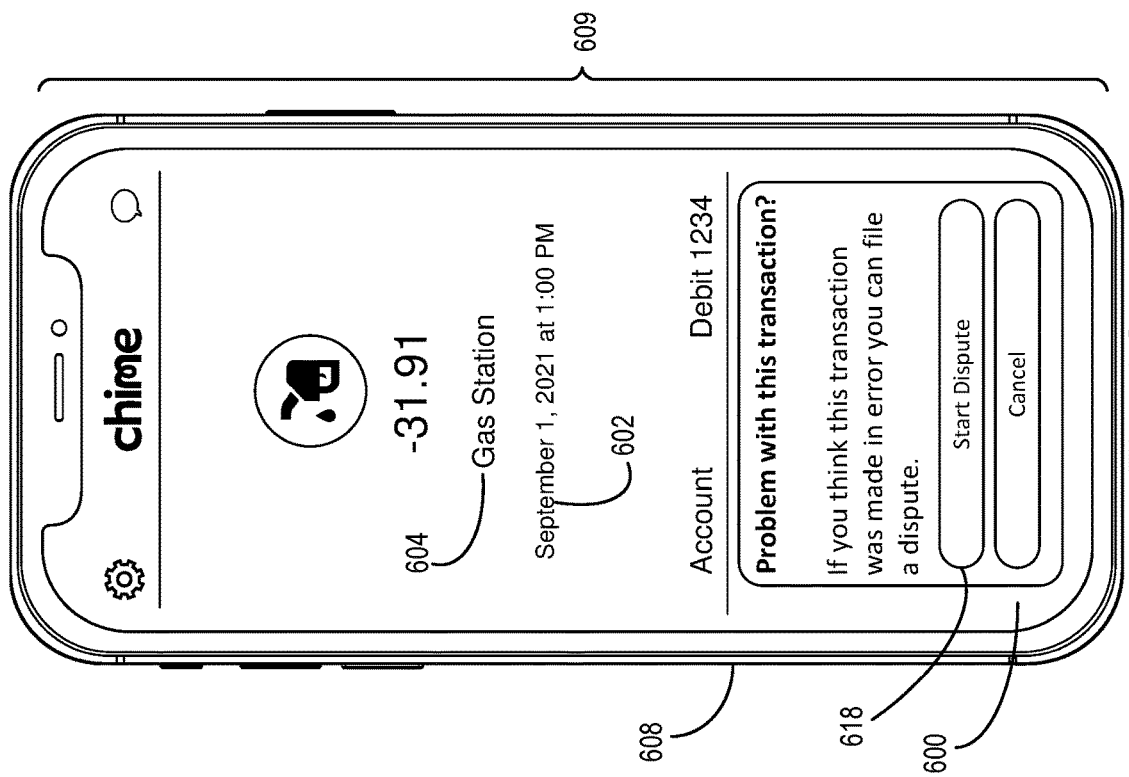

FIG. 6C illustrates the client device 608, device application 609 and the graphical user interface 600 displaying an option to for the multi-transaction dispute system 102 to perform an act 618 "start dispute." Specifically, FIG. 6B showed element 616 as the indication 616 of "problem with this transaction." Subsequent to selecting this option, the graphical user interface 600 displays an option for the client device 608 to indicate starting the dispute process. The client device 608 determines whether to start the dispute request based on whether the client device 608 deems that the transaction was made in error.

In response to the client device 608 receiving a use selection to start the dispute, FIG. 6D illustrates the graphical user interface 600 with the display of an interactive query. Specifically, the interactive query in FIG. 6D asks "did you make this transaction?" The client device 608 can indicate affirmatively 620 or negatively 621 as to whether the client device 608 made the debit transaction 604. The negative response 621 can indicate to the multi-transaction dispute system 102 the transaction as unauthorized while the affirmative response 620 can indicate a different dispute classification (e.g., the dispute classification 400 as discussed in reference to FIG. 4).

Following the determination of who made the transaction as shown in FIG. 6D, the multi-transaction dispute system 102 can ask a number of follow up queries. Depending on the type of dispute request, the graphical user interface 600 can vary the displayed interactive queries (see previous discussion on the act 314 of providing a plurality of interactive queries in FIG. 3). For example, for the negative response 621, the multi-transaction dispute system 102 can ask the client device 608 to send a note via email or chat-bot detailing someone else performing the transaction. Additional queries from the multi-transaction dispute system 102 can include a statement of "let's get you a new card, we'll freeze your current card and send you a new one" in response to indicating an unauthorized transaction based on losing a card.

In another example embodiment, in response to the multi-transaction dispute system 102 determining the dispute type as ACH transfer, the multi-transaction dispute system may ask "did you know the recipient of this transaction?" Or the multi-transaction dispute system 102 can ask questions such as "did you share your account and routing number with the recipient?" "Does someone you know have access to your account?" "Did someone you do not know ask for your account or routing number?" And as follow up questions, the multi-transaction dispute system 102 can ask "how were you contacted?" "Which social media site were you contacted on?" "Have any of the following been lost or stolen? (Phone, wallet, card, etc.)."

In other situations where the multi-transaction dispute system 102 determines the dispute type as ATM withdrawal, the multi-transaction dispute system 102 may ask "how much did you withdraw?" For dispute types that involve credit or debit transactions, the multi-transaction dispute system 102 may ask "tell us about the last contact you had with the merchant?" "What kind of purchase was it?" "Was it a one-time or recurring purchase?" "Please describe your purchase?" "When did you receive your purchase?" "How satisfied were you with this purchase?" "What was wrong with your purchase?" "Was the transaction canceled?" "Did you receive a cancellation number?" "Do you have a photo of the receipt?" "Did you return the item?" "What's the tracking number?" "Is there anything else you would like to tell us?" Note that the above queries can also be used in combination with any of the dispute types and answers can be processed in terms of a decision tree that ultimately leads to the system determining a dispute classification.

Figure 6F:
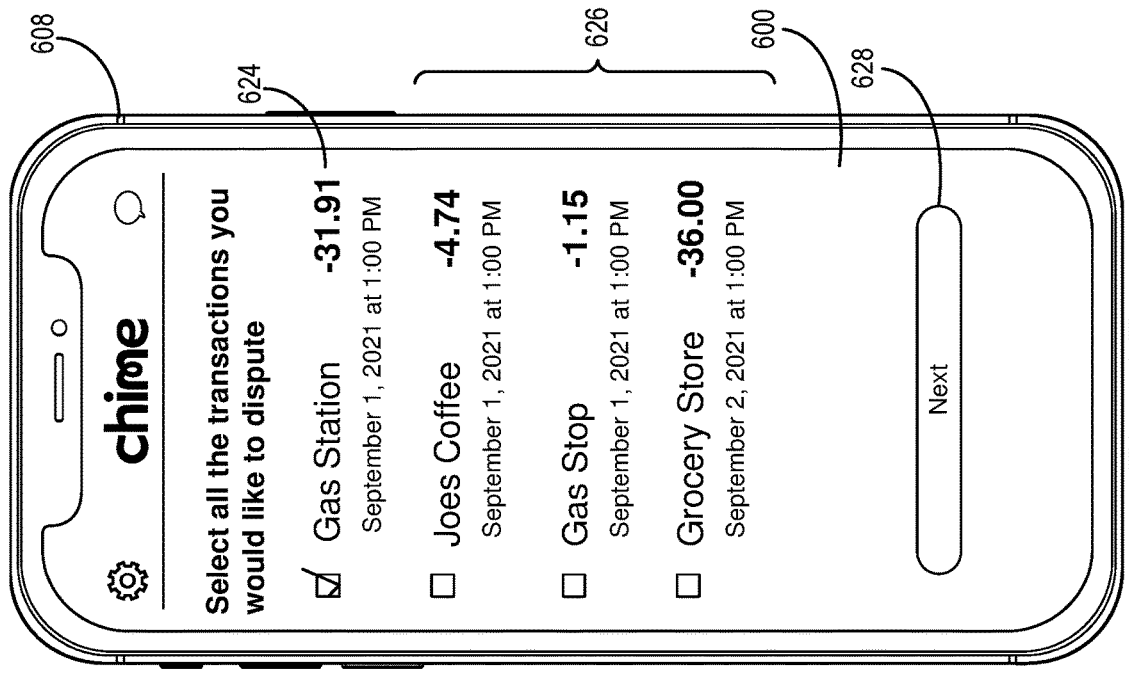
Figure 6E:
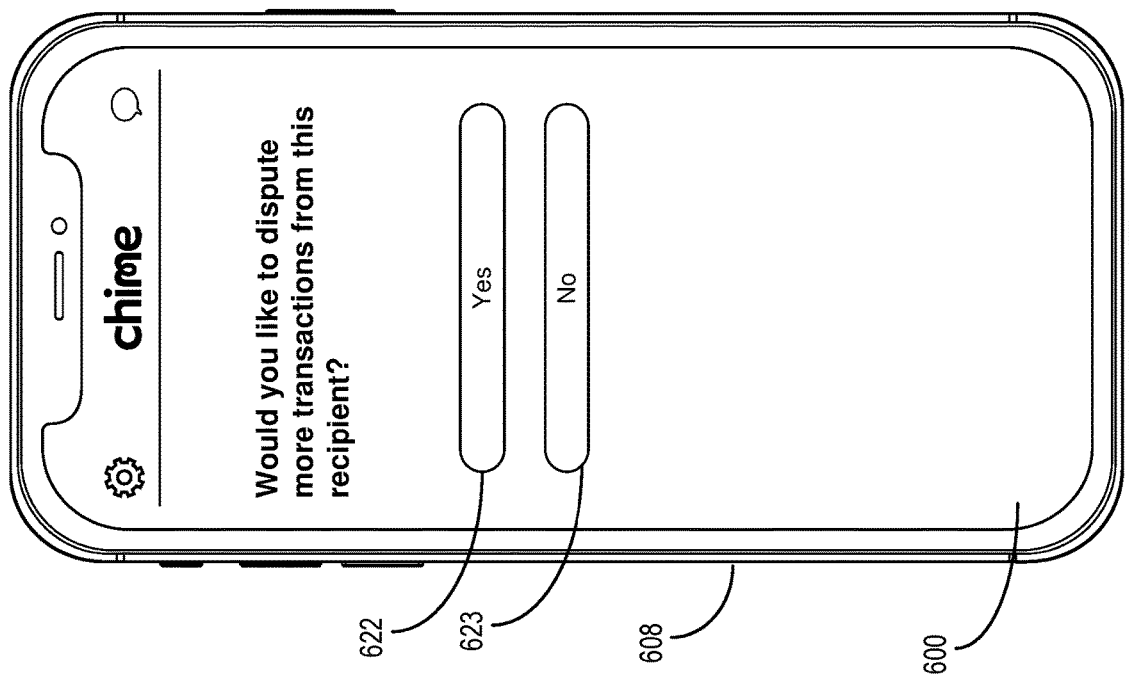

FIG. 6E illustrates the graphical user interface 600 of the client device 608 and device application 609 for disputing more transactions in addition to the initial disputed transaction. Specifically, the graphical user interface 600 displays the question "would you like to dispute more transactions from this recipient?" and provides the option of confirming multiple transactions 622 or denying multiple transactions 623. The multi-transaction dispute system 102 displays the graphical user interface 600 in FIG. 6E in response to receiving the initial disputed transaction.

For example, FIG. 6E in response to receiving a confirmation 622 of the client device 608 selecting to dispute multiple transactions, the multi-transaction dispute system 102 will perform the act of determining the dispute classification, identifying one or more potential transactions, and generating a list of potential transactions (see discussion of FIG. 3). FIG. 6F illustrates the list of potential transactions.

Specifically, FIG. 6F shows graphical user interface 600, client device 608, device application 609, an initial disputed transaction 624, and one or more potential transactions 626. For example, a user associated with the client device 608 can select one or more potential transactions 626 in addition to the already selected initial disputed transaction 624. In particular, FIG. 6F shows "gas station" as the initial disputed transaction 624 and the other identified one or more potential transactions 626 can be processed together with the initial disputed transaction 624. In particular, after receiving a selection of one or more potential transactions 626, the client device 608 can indicate to the multi-transaction dispute system 102 a completion 628 of selecting one or more potential transactions. While FIG. 6F illustrates the initial disputed transaction 624 and one or more potential transactions 626 as a debit transaction, these can also involve ACH transfers, ATM withdrawals, and credit transactions. As discussed above, the capability of the system to receive multiple transactions in a multi-transaction dispute package further improves the efficiency, flexibility, and available resources of the multi-transaction dispute system 102.

Figure 6G:
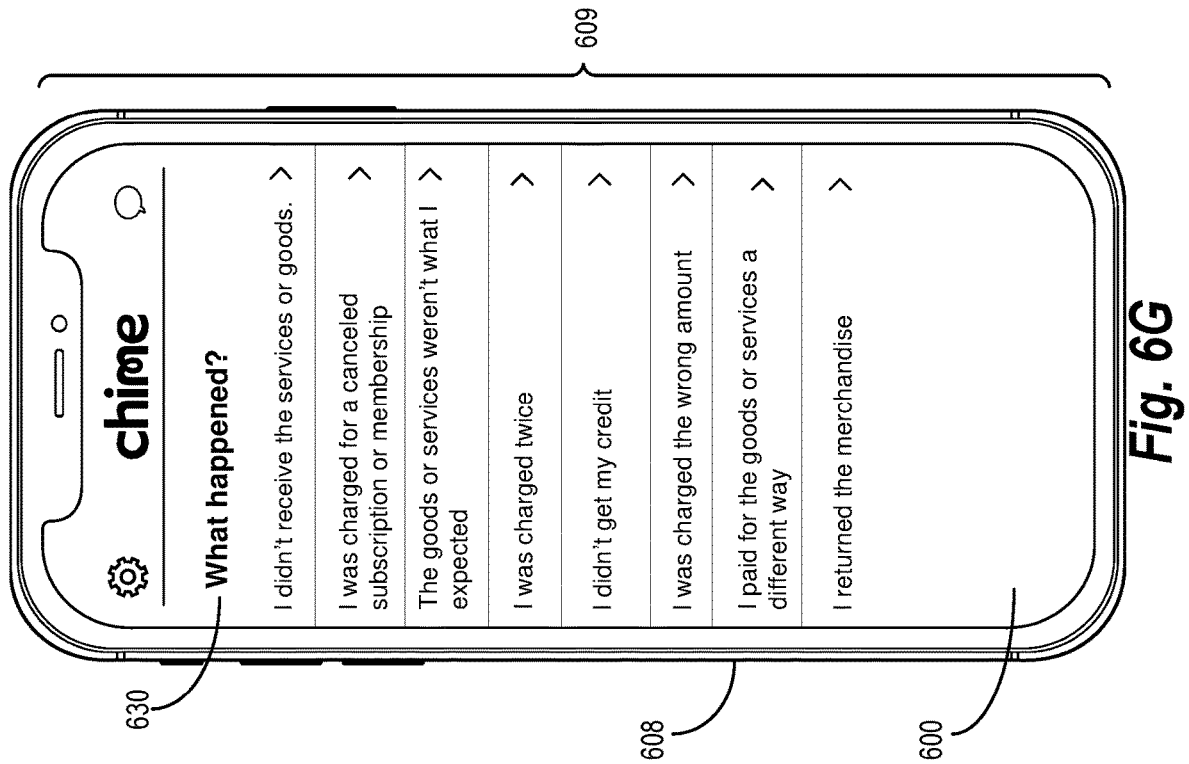

While FIG. 6A-6F illustrated the graphical user interface 600 flow for disputing multiple transactions, FIG. 6G illustrates a potential interactive query 630 provided to the client device 608, device application 609 and displayed on the graphical user interface 600. For example, in response to the client device 608 indicating a transaction as disputed, the graphical user interface 600 may display FIG. 6G. In particular, the client device 608 can indicate the initial disputed transaction as "I didn't receive the services or goods," "I was charged for a canceled subscription or membership," "the goods or services weren't what I expected," "I was charged twice," "I didn't get my credit," "I was charged the wrong amount," "I paid for the goods or services a different way," or "I returned the merchandise." As discussed above, the client device 608 making this indication assists the multi-transaction dispute system 102 in determining the dispute classification.

In some example embodiments, for classifications such as "I didn't receive the goods or services," "I was charged for a canceled subscription or membership," "the goods or services weren't what I expected," and "the goods or services weren't what I expected," the multi-transaction dispute system 102 allows for the multi-transaction dispute package (e.g., the multi-transaction dispute package 502 as discussed with reference to FIG. 5). In particular, these example embodiments allow for multi-transaction dispute packages because inherently, dispute classifications such as "I didn't receive the goods or services," can include multiple transactions.

In other example embodiments, the multi-transaction dispute system 102 does not allow multi-transaction dispute packages for certain dispute classifications. For example, classifications such as "I was charged twice," "I didn't get my credit," "I was charged the wrong amount," "I paid the goods or services in a different way," and "I returned the merchandise" do not allow for multi-transaction dispute packages. In particular, these example embodiments do not allow for multi-transaction dispute packages because inherently, classifications such as "I was charged twice" indicates only one disputed transaction. Or the classification of "I was charged the wrong amount" has a low likelihood of having multiple incorrectly charged transactions, thus it is impractical to allow for the multi-transaction dispute package. Allowing for multi-transaction dispute packages for these classifications also has the potential for fraud. The multi-transaction dispute system 102 restricting multi-transaction dispute packages for some classifications contributes to reducing the overall amount of fraud and increasing the computational resources of the multi-transaction dispute system 102.

In other situations, a user associated with the client device 608 may select a pending transaction for dispute. The multi-transaction dispute system 102 may prohibit the client device from selecting a pending transaction. Alternatively, the multi-transaction dispute system 102 may allow the client device 608 to select a pending transaction but the multi-transaction dispute system 102 will not investigate the pending transaction until it is settled. For pending transactions, the multi-transaction dispute system 102 may not allow for a multi-transaction dispute package.

The above discussion of FIG. 6A-6G illustrates a variety of graphical user interfaces 600 where the client device 608 disputes a transaction. However, in other example embodiments, the multi-transaction dispute system 102 restricts the filing of disputes and multi-transaction dispute packages for ACH transfers because of the high potential for fraud. Essentially, alternative embodiments limit the filing of multi-transaction dispute packages for some types of dispute requests to reduce fraud in the multi-transaction dispute system 102.

In some example embodiments, the multi-transaction dispute system 102 does not allow a transaction already disputed to be disputed again. This prevents the multi-transaction dispute system 102 from receiving frivolous requests, reduces the burden on computational resources, and prevents fraudulent requests.

In certain example embodiments, the multi-transaction dispute system 102 may limit the multi-transaction dispute package to a specified number of transactions, such as three (3). To elaborate, the client device 608 can file separate dispute requests with a total exceeding the specified number of transactions, but the multi-transaction dispute system 102 can restrict the multi-transaction dispute package to the specified number of transactions. The multi-transaction dispute system 102 can pre-establish the specified number of transactions or determine the specified number of transactions via machine learning models. In particular, if the client device 608 attempts to exceed the specified number of transactions in a multi-transaction dispute package, then the multi-transaction dispute system 102 can initiate a client device/agent session.

Moreover, in generating the list of potential transactions potentially related to the initial disputed transaction, in some situations the multi-transaction dispute system 102 may not provide a list. In this situation, the multi-transaction dispute system 102 requires the client device 608 to file separate dispute requests.

Following the generation of the multi-transaction dispute package, the multi-transaction dispute system 102 provides status notifications 722. FIG. 7A illustrates a graphical user interface 700 displaying the status notifications 722. Specifically, FIG. 7A illustrates two disputed transactions, an initial disputed transaction 702, an additional disputed transaction 704 and a plurality of resolution events (706-716). For example, an agent device (e.g., the agent device 514 as discussed with reference to FIG. 5) receives the multi-transaction dispute package (e.g., the multi-transaction dispute package 502 as discussed with reference to FIG. 5) from the multi-transaction dispute system 102 and the multi-transaction dispute system 102 provides event updates to the client device 703 through the graphical user interface 700. In particular, the multi-transaction dispute package includes the initial disputed transaction 702 and the additional disputed transaction 704. The status notifications 722 also indicates the date and transaction amount of each disputed transaction.

In one or more embodiments, the status notifications 722 can include a timeline. As used herein, the term "timeline" refers to a representation of different events during the processing of the multi-transaction dispute package. In particular, the "timeline" can show different events such as "multi-transaction dispute package received" or "processing multi-transaction dispute package" or "multi-transaction dispute package partially approved." To illustrate, the timeline can display two disputed transactions for a gas station where both transactions are being processed by the agent device.

Furthermore, the plurality of resolution events (706-716) indicate at least one of a reported dispute date, an expected resolution date, a resolution date, and a variety of status updates. As used herein, the term "resolution events" refers to a completion of a specific event. To illustrate, the resolution events can display that the likely date as to when the dispute will be closed is Nov. 29, 2021. Or the resolution events can display that a final review is being done on the multi-transaction dispute package.

Figure 7C:
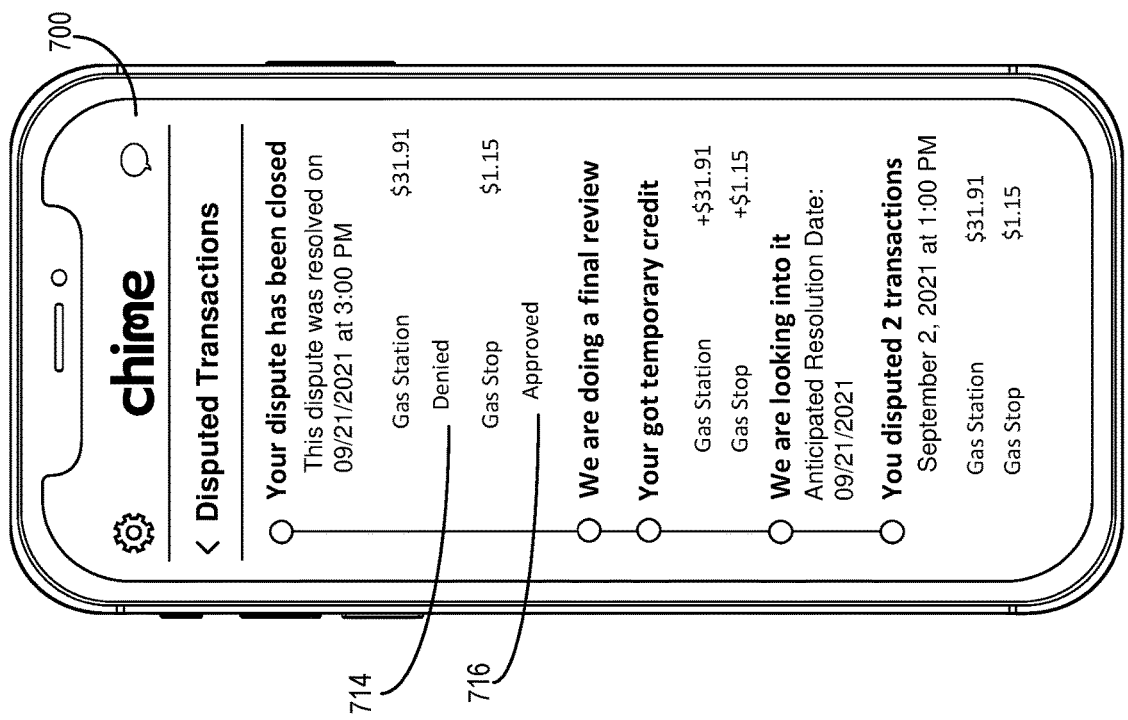

For example, an initial event 706 indicates the high-level details of the multi-transaction dispute package, while "we are looking into it" indicates the agent device has performed an act 708 of receiving the multi-transaction dispute package. Moreover, the status notifications 722 indicates a final review 710, a closed dispute 712, a final status for the initial disputed transaction 716 and a final status for the additional disputed transaction 714. While FIG. 7A illustrates the final status for the initial disputed transaction 716 and the final status for the additional disputed transaction 714 as denied, FIG. 7B illustrates the final status for the initial disputed transaction 716 and the final status for the additional disputed transaction 714 as approved. Whereas FIG. 7C illustrates the final status for the initial disputed transaction 716 as approved and the final status for the additional disputed transaction 714 as denied.

Although FIG. 7A-7C displays the status notifications 722 for multi-transaction dispute packages, the graphical user interface 700 can also display a plurality of multi-transaction dispute packages associated with the client device 703. This display of all the multi-transaction dispute packages at once has at least one of an anticipated date of resolution, an overall status, or a current status. Selecting one of the pluralities of multi-transaction dispute packages causes the graphical user interface 700 to display the status notifications 722 as shown in FIG. 7A-7C.

FIGS. 1-7, the corresponding text, and the examples provide a number of different systems, methods, and non-transitory computer readable media for selecting and providing a transportation request to a limited-eligibility provider device. In addition to the foregoing, embodiments can also be described in terms of flowcharts comprising acts for accomplishing a particular result. For example, FIG. 8 illustrates a flowchart of an example sequence of acts in accordance with one or more embodiments.

Figure 8:
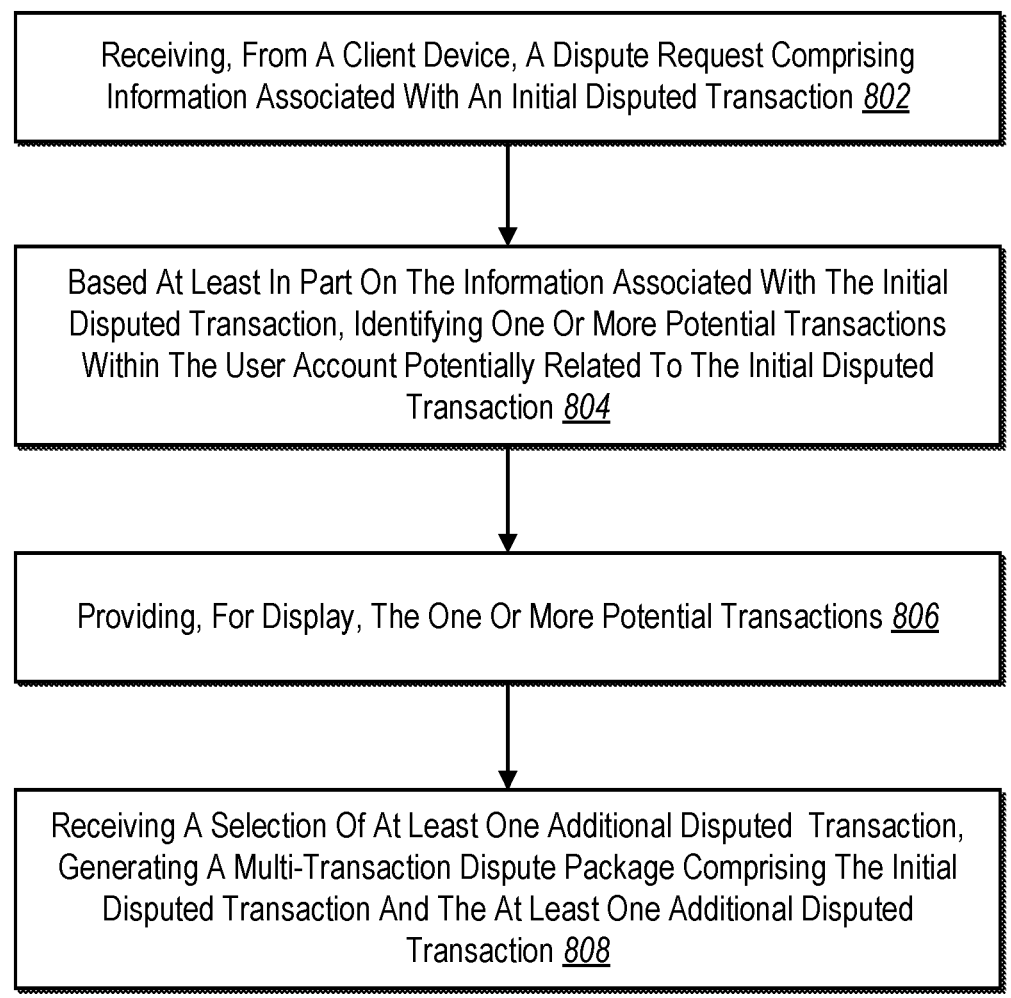
FIG. 8 illustrates an example series of acts for generating a multi-transaction dispute package in accordance with one or more embodiments.

While FIG. 8 illustrates acts according to some embodiments, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8. Additionally, the acts described herein may be repeated or performed in parallel with one another or in parallel with different instances of the same or other similar acts.

FIG. 8 illustrates an example series of acts 800 for facilitating a multi-transaction dispute package via a multi-transaction dispute system. The series of acts 800 can include an act 802 of receiving, from a client device, a dispute request comprising information associated with an initial disputed transaction. In addition, the act 802 of receiving, from a client device, can include, a dispute request comprising information associated with an initial disputed transaction within a user account corresponding to the client device.

As shown, the series of acts 800 can also include an act 804 of based at least in part on the information associated with the initial disputed transaction, identifying one or more potential transactions within the user account that are potentially related to the initial disputed transaction. Further, the act 804 can include determining a dispute classification. In particular, the act 804 can include wherein identifying one or more potential transactions within the user account that are potentially related with the initial disputed transaction further comprises determining a dispute classification based on the information associated with the initial disputed transaction and wherein identifying the one or more potential transactions is based on the dispute classification.

In addition, the act 804 of identifying one or more potential transactions with dispute classifications can include wherein the dispute classification comprises at least one of an unauthorized transaction, non-receipt, a device malfunction, a cancelled transaction, a non-matching description, an unauthorized external transfer, or a duplicate transaction.

Furthermore, the act 804 includes wherein identifying the one or more potential transactions further comprises analyzing metadata associated with each transaction of the one or more potential transactions and determining the metadata associated with each transaction of the one or more potential transactions meets a condition associated with at least one of a date, a recency, a merchant type, or a transaction amount.

The act 804 also includes determining a dispute classification associated with the initial disputed transaction by receiving a user defined selection of the dispute classification from the client device, providing a plurality of interactive queries to the client device, and receiving a plurality of responses from the client device, or automatically identifying the dispute classification based on the information associated with the initial disputed transaction. Moreover, the act 804 includes wherein identifying the one or more potential transactions comprises using at least one of a rule-based model or a machine learning model.

As shown, the series of acts 800 can also include an act 806 of providing, for display, the one or more potential transactions. In addition, the act 806 of providing, can including providing, for display on the client device, the one or more potential transactions. Further, the act 806 can include wherein providing, for display on the client device, the one or more potential transactions further comprises listing the one or more potential transactions in a ranked order based on at least one of recency, likelihood of relatedness, merchant type, or transaction amount.

As shown, the series of acts 800 can also include an act 808 of receiving a selection of at least one additional disputed transaction, generating a multi-transaction dispute package comprising the initial disputed transaction and the at least one additional disputed transaction. In addition, the act 808 of receiving can include, based on receiving, from the client device, an indication of a selection of at least one additional disputed transaction from the one or more potential transactions, generating a multi-transaction dispute package comprising the initial disputed transaction and the at least one additional disputed transaction.

Further, the act 808 can include providing, for display on the client device, a timeline that indicates one or more resolution events of the initial disputed transaction and the at least one additional disputed transaction from the multi-transaction dispute package. The act 808 also includes wherein the one or more resolution events comprise at least one of a report dispute date, an expected resolution date, or a resolution date. Moreover, the act 808 includes determining a resolution corresponding to the multi-transaction dispute package by determining both an initial disputed transaction resolution and the at least one additional disputed transaction resolution.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
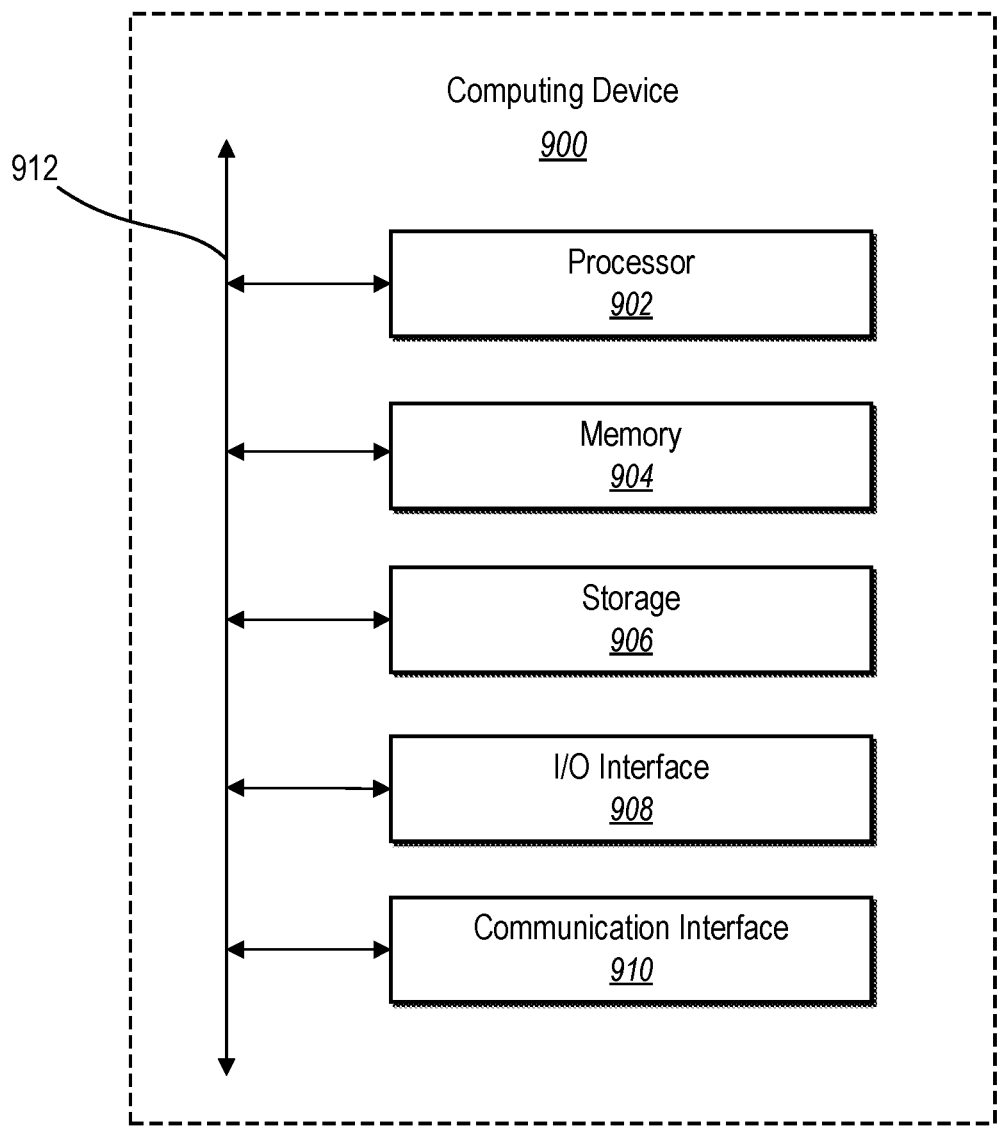
FIG. 9 illustrates a block diagram of a computing device for implementing one or more embodiments of the present disclosure.

FIG. 9 illustrates, in block diagram form, an exemplary computing device 900 (e.g., the client device 108, or the server(s) 106) that may be configured to perform one or more of the processes described above. As shown by FIG. 9, the computing device can comprise a processor 902, memory 904, a storage device 906, an I/O interface 908 interface 908, and a communication interface 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 906 and decode and execute them.

The computing device 900 includes memory 904, which is coupled to the processor(s) 802. The memory 904 may be used for storing data, metadata, and programs for execution by the processor(s). The memory 904 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, storage device 906 can comprise a non-transitory storage medium described above. The storage device 906 may include a hard disk drive ("HDD"), flash memory, a Universal Serial Bus ("USB") drive or a combination of these or other storage devices.

The computing device 900 also includes one or more input or output interface 908 interface 908 (or "I/O interface 908"), which are provided to allow a user (e.g., requester or provider) to provide input to (such as user strokes), receive output from, and otherwise transfer data to and from the computing device 900. These I/O interface 908 may include a mouse, keypad or a keyboard, a touch screen, camera, optical scanner, network interface, modem, other known I/O devices or a combination of such I/O interface 908. The touch screen may be activated with a stylus or a finger.

The I/O interface 908 may include one or more devices for presenting output to a user, including, but not limited to, a graphics engine, a display (e.g., a display screen), one or more output providers (e.g., display providers), one or more audio speakers, and one or more audio providers. In certain embodiments, interface 908 is configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 800 or one or more networks. As an example, and not by way of limitation, communication interface 910 may include a network interface controller ("NIC") or network adapter for communicating with an Ethernet or other wire-based network or a wireless NIC ("WNIC") or wireless adapter for communicating with a wireless network, such as a WI-FI. The computing device 900 can further include a bus 912. The bus 912 can comprise hardware, software, or both that connects components of computing device 900 to each other.

Figure 10:
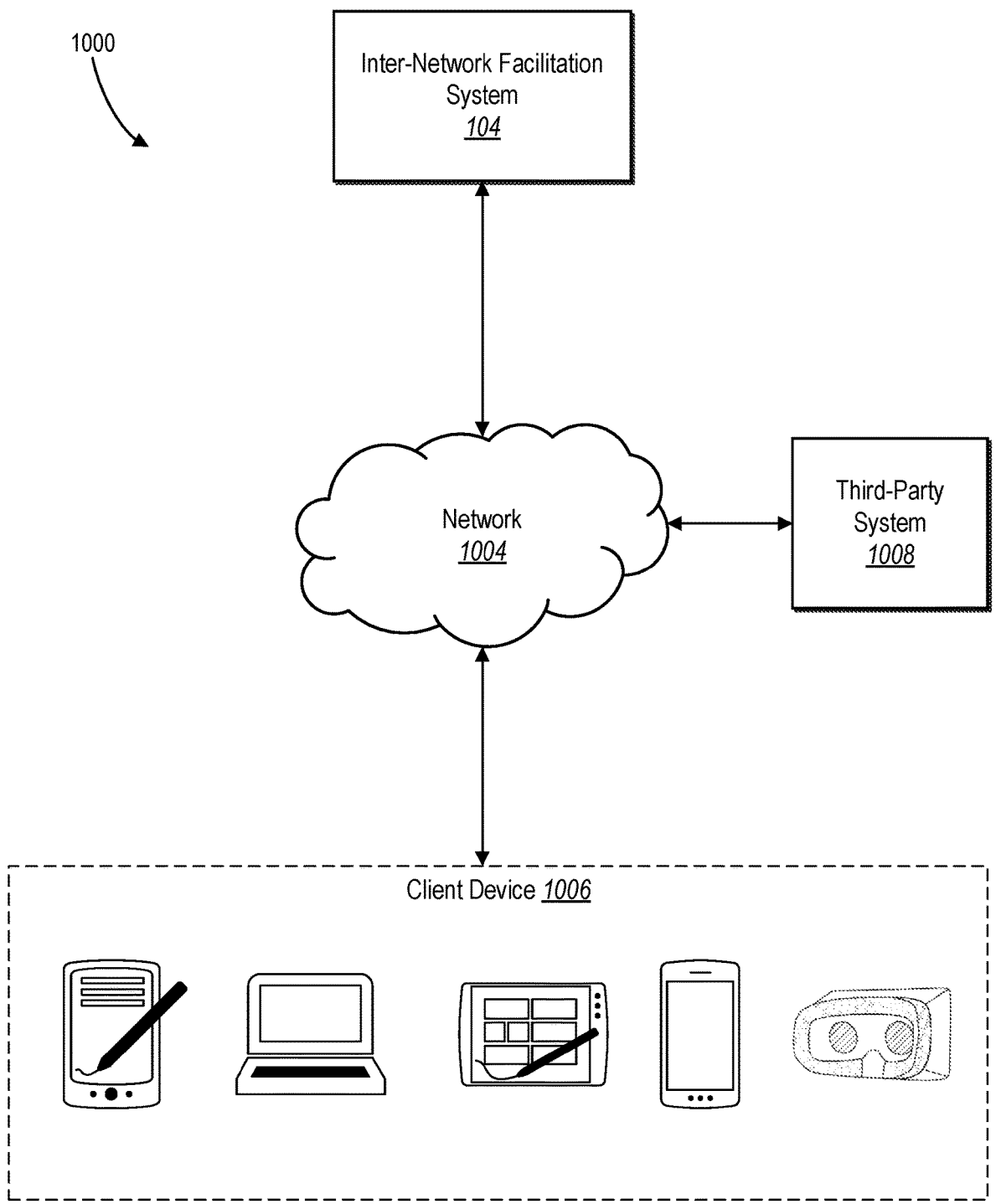
FIG. 10 illustrates an example environment for a multi-transaction dispute system in accordance with one or more embodiments.

FIG. 10 illustrates an example network environment 1000 of the inter-network facilitation system 104. The network environment 1000 includes a client device 1006 (e.g., client device 108), an inter-network facilitation system 104, and a third-party system 1008 connected to each other by a network 1004. Although FIG. 10 illustrates a particular arrangement of the client device 1006, the inter-network facilitation system 104, the third-party system 1008, and the network 1004, this disclosure contemplates any suitable arrangement of client device 1006, the inter-network facilitation system 104, the third-party system 1008, and the network 1004. As an example, and not by way of limitation, two or more of client device 1006, the inter-network facilitation system 104, and the third-party system 1008 communicate directly, bypassing network 1004. As another example, two or more of client device 1006, the inter-network facilitation system 104, and the third-party system 1008 may be physically or logically co-located with each other in whole or in part.

Moreover, although FIG. 10 illustrates a particular number of client devices 1006, inter-network facilitation systems 104, third-party systems 1008, and networks 1004, this disclosure contemplates any suitable number of client devices 1006, inter-network facilitation system 104, third-party systems 1008, and networks 1004. As an example, and not by way of limitation, network environment 1000 may include multiple client device 1006, inter-network facilitation system 104, third-party systems 1008, and/or networks 1004.

This disclosure contemplates any suitable network 1004. As an example, and not by way of limitation, one or more portions of network 1004 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1004 may include one or more networks 1004.

Links may connect client device 1006 and third-party system 1008 to network 1004 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, the client device 1006 may be an electronic device including hardware, software, or embedded logic components or a combination of two or more such components and capable of carrying out the appropriate functionalities implemented or supported by client device 1006. As an example, and not by way of limitation, a client device 1006 may include any of the computing devices discussed above in relation to FIG. 10. A client device 1006 may enable a network user at the client device 1006 to access network 1004. A client device 1006 may enable its user to communicate with other users at other client devices 1006.

In particular embodiments, the client device 1006 may include a requester application or a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at the client device 1006 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1006 one or more Hyper Text Markup Language ("HTML") files responsive to the HTTP request. The client device 1006 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 1004) to link the third-party-system 1008. For example, the inter-network facilitation system 104 may receive authentication credentials from a user to link a third-party system 1008 such as an online bank account, credit account, debit account, or other financial account to a user account within the inter-network facilitation system 104. The inter-network facilitation system 104 can subsequently communicate with the third-party system 1008 to detect or identify balances, transactions, withdrawal, transfers, deposits, credits, debits, or other transaction types associated with the third-party system 1008. The inter-network facilitation system 104 can further provide the aforementioned or other financial information associated with the third-party system 1008 for display via the client device 1006. In some cases, the inter-network facilitation system 104 links more than one third-party system 1008, receiving account information for accounts associated with each respective third-party system 1008 and performing operations or transactions between the different systems via authorized network connections.

In particular embodiments, the inter-network facilitation system 104 may interface between an online banking system and a credit processing system via the network 1004. For example, the inter-network facilitation system 104 can provide access to a bank account of a third-party system 1008 and linked to a user account within the inter-network facilitation system 104. Indeed, the inter-network facilitation system 104 can facilitate access to, and transactions to and from, the bank account of the third-party system 1008 via a client application of the inter-network facilitation system 104 on the client device 1006. The inter-network facilitation system 104 can also communicate with a credit processing system, an ATM system, and/or other financial systems (e.g., via the network 1004) to authorize and process credit charges to a credit account, perform ATM transactions, perform transfers (or other transactions) across accounts of different third-party systems 1008, and to present corresponding information via the client device 1006.

In particular embodiments, the inter-network facilitation system 104 includes a model for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 908), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 1000 either directly or via network 1004. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1006, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 1004.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 1006. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 1006. Information may be pushed to a client device 1006 as notifications, or information may be pulled from client device 1006 responsive to a request received from client device 1006. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 1006 associated with users.

In addition, the third-party system 1008 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 1004. A third-party system 1008 can communicate with the inter-network facilitation system 104 to provide financial information pertaining to balances, transactions, and other information, whereupon the inter-network facilitation system 104 can provide corresponding information for display via the client device 1006. In particular embodiments, a third-party system 1008 communicates with the inter-network facilitation system 104 to update account balances, transaction histories, credit usage, and other internal information of the inter-network facilitation system 104 and/or the third-party system 1008 based on user interaction with the inter-network facilitation system 104 (e.g., via the client device 1006). Indeed, the inter-network facilitation system 104 can synchronize information across one or more third-party systems 908 to reflect accurate account information (e.g., balances, transactions, etc.) across one or more networked systems, including instances where a transaction (e.g., a transfer) from one third-party system 1008 affects another third-party system 1008.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
  receiving, from a client device, a dispute request comprising information associated with an initial disputed transaction within a user account corresponding to the client device;
  determining a dispute classification for the initial disputed transaction by analyzing, utilizing a combination of machine learning models and heuristic models, metadata of the initial disputed transaction, the dispute classification corresponding to a dispute classification category, the dispute classification category comprising one of: an unauthorized transaction, a device malfunction, a non-receipt of goods, or a non-matching description of goods received;
  identifying one or more potential transactions within the user account to generate a multi-transaction dispute package comprising the initial disputed transaction and the one or more potential transactions by:
    selecting, based on the dispute classification category, a machine learning model from a plurality of machine learning models;
    encoding the dispute classification; and
    utilizing the selected machine learning model to process the encoding of the dispute classification and output the one or more potential transactions;
  providing, for display on the client device, the one or more potential transactions; and
  based on receiving, from the client device, an indication of a selection of at least one additional disputed transaction from the one or more potential transactions, generating the multi-transaction dispute package comprising the initial disputed transaction and the at least one additional disputed transaction.

2. The computer-implemented method of claim 1, wherein identifying one or more potential transactions within the user account that are potentially related with the initial disputed transaction further comprises:
  selecting heuristic-based model from a plurality of heuristic-based models; and wherein identifying the one or more potential transactions is based on also utilizing the selected heuristic-based model for the dispute classification.

3. The computer-implemented method of claim 1, wherein the dispute classification category further comprises a cancelled transaction; an unauthorized external transfer; or a duplicate transaction.

4. The computer-implemented method of claim 1, wherein identifying the one or more potential transactions further comprises:
analyzing, utilizing the combination of the machine learning models and the heuristic models, the metadata associated with each transaction of the one or more potential transactions; and
determining the metadata associated with each transaction of the one or more potential transactions meets a condition associated with at least one of a date, a recency, a merchant type, or a transaction amount.

5. The computer-implemented method of claim 1, further comprising determining a dispute classification associated with the initial disputed transaction by receiving a selection of the dispute classification from the client device, providing a plurality of interactive queries to the client device, and receiving a plurality of responses from the client device, or automatically identifying the dispute classification based on the information associated with the initial disputed transaction.

6. The computer-implemented method of claim 1, wherein identifying the one or more potential transaction within the user account further comprises:
processing the encoding of the dispute classification to identify a subset of potential transactions from the user account that conforms with the determined dispute classification for the initial disputed transaction; and
providing only the subset of potential transactions from the user account that conforms with the determined dispute classification for the initial disputed transaction to the client device for selection of at least one additional disputed transaction.

7. The computer-implemented method of claim 1, further comprising providing, for display on the client device, a timeline that indicates one or more resolution events of the initial disputed transaction and the at least one additional disputed transaction from the multi-transaction dispute package.

8. The computer-implemented method of claim 7, wherein the one or more resolution events comprise at least one of a report dispute date, an expected resolution date, or a resolution date.

9. The computer-implemented method of claim 1, further comprising determining a resolution corresponding to the multi-transaction dispute package by determining both an initial disputed transaction resolution and an at least one additional disputed transaction resolution.

10. The computer-implemented method of claim 1, wherein providing, for display on the client device, the one or more potential transactions further comprises listing the one or more potential transactions in a ranked order based on at least one of recency, likelihood of relatedness, merchant type, or transaction amount.

11. A non-transitory computer-readable medium storing instructions that, when executed by at least one processor, cause a computer system to:
receive, from a client device, a dispute request comprising information associated with an initial disputed transaction within a user account corresponding to the client device;
determine a dispute classification for the initial disputed transaction by analyzing, utilizing a combination of machine learning models and heuristic models, metadata of the initial disputed transaction, the dispute classification corresponding to a dispute classification category, the dispute classification category comprising one of: an unauthorized transaction, a device malfunction, a non-receipt of goods, or a non-matching description of goods received;
identify one or more potential transactions within the user account to generate a multi-transaction dispute package comprising the initial disputed transaction and the one or more potential transactions by:
selecting, based on the dispute classification category, a machine learning model from a plurality of machine learning models;
encoding the dispute classification; and
utilizing the selected machine learning model to process the encoding of the dispute classification and output the one or more potential transactions;
provide, for display on the client device, the one or more potential transactions; and
based on receiving, from the client device, an indication of a selection of at least one additional disputed transaction from the one or more potential transactions, generate the multi-transaction dispute package comprising the initial disputed transaction and the at least one additional disputed transaction.

12. The non-transitory computer-readable medium of claim 11, wherein the non-transitory computer-readable medium further stores instructions that, when executed by at least one processor, cause the computer system to identifying one or more potential transactions within the user account by:
selecting a heuristic-based model from a plurality of heuristic-based models; and
wherein identifying the one or more potential transactions is based on also utilizing the selected heuristic-based model for the dispute classification.

13. The non-transitory computer-readable medium of claim 12, wherein the dispute classification category further comprises a cancelled transaction; an unauthorized external transfer; or a duplicate transaction.

14. The non-transitory computer-readable medium of claim 11, wherein the non-transitory computer-readable medium further stores instructions that, when executed by at least one processor, cause the computer system to identify the one or more potential transactions by:
analyzing, utilizing the combination of the machine learning models and the heuristic models, the metadata associated with each transaction of the one or more potential transactions; and
determining the metadata associated with each transaction of the one or more potential transactions meets a condition associated with at least one of a date, a recency, a merchant type, or a transaction amount.

15. The non-transitory computer-readable medium of claim 11, further comprising determining a dispute classification associated with the initial disputed transaction by receiving a selection of the dispute classification from the client device, providing a plurality of interactive queries to the client device and receiving a plurality of responses from the client device, or automatically identifying the dispute classification based on the information associated with the initial disputed transaction.

16. The non-transitory computer-readable medium of claim 11, wherein the non-transitory computer-readable medium further stores instructions that, when executed by at least one processor, cause the computer system to identify the one or more potential transaction within the user account by:
  processing the encoding of the dispute classification to identify a subset of potential transactions from the user account that conforms with the determined dispute classification for the initial disputed transaction; and
  providing only the subset of potential transactions from the user account that conforms with the determined dispute classification for the initial disputed transaction to the client device for selection of at least one additional disputed transaction.

17. A system comprising:
  at least one processor; and
  at least one non-transitory computer-readable storage medium storing instructions that, when executed by the at least one processor, cause the system to:
  receive, from a client device, a dispute request comprising information associated with an initial disputed transaction within a user account corresponding to the client device;
  determine a dispute classification for the initial disputed transaction by analyzing, utilizing a combination of machine learning models and heuristic models, metadata of the initial disputed transaction, the dispute classification corresponding to a dispute classification category, the dispute classification category comprising one of: an unauthorized transaction, a device malfunction, a non-receipt of goods, or a non-matching description of goods received;
  identify one or more potential transactions within the user account to generate a multi-transaction dispute package comprising the initial disputed transaction and the one or more potential transactions by:
    selecting, based on the dispute classification category, a machine learning model from a plurality of machine learning models;
    encoding the dispute classification; and
    utilizing the selected machine learning model to process the encoding of the dispute classification and output the one or more potential transactions;
  provide, for display on the client device, the one or more potential transactions; and
  based on receiving, from the client device, an indication of a selection of at least one additional disputed transaction from the one or more potential transactions, generate the multi-transaction dispute package comprising the initial disputed transaction and the at least one additional disputed transaction.

18. The system of claim 17, wherein identifying one or more potential transactions within the user account further comprising instructions that, when executed by the at least one processor, cause the system to:
  select a heuristic-based model from a plurality of heuristic-based models in addition to the selected machine learning model; and
  wherein identifying the one or more potential transactions is based on also utilizing the selected heuristic-based model for the dispute classification.

19. The system of claim 17, wherein identifying the one or more potential transactions, that when executed by the at least one processor, further cause the system to:
  analyze, utilizing the combination of the machine learning models and the heuristic models, the metadata associated with each transaction of the one or more potential transactions; and
  determine the metadata associated with each transaction of the one or more potential transactions meets a condition associated with at least one of a date, a recency, a merchant type, or a transaction amount.

20. The system of claim 17, that when executed by the at least one processor, cause the system to: provide for display on the client device, a timeline that indicates one or more resolution events of the initial disputed transaction and the at least one additional disputed transaction from the multi-transaction dispute package.

* * * * *